US012695209B2

(12) United States Patent
Zhang et al.

(10) Patent No.: US 12,695,209 B2
(45) Date of Patent: Jul. 28, 2026

(54) PREPARATION METHOD FOR ELECTRONIC DEVICE AND MILLIMETER WAVE ANTENNA

(71) Applicants: Beijing BOE Technology Development Co., Ltd., Beijing (CN); BOE Technology Group Co., Ltd., Beijing (CN)

(72) Inventors: Yafei Zhang, Beijing (CN); Xudong Zhang, Beijing (CN); Dongdong Zhang, Beijing (CN); Mengwen Jia, Beijing (CN); Mengxia Yu, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 109 days.

(21) Appl. No.: 18/283,502

(22) PCT Filed: Oct. 25, 2022

(86) PCT No.: PCT/CN2022/127399

§ 371 (c)(1),
(2) Date: Sep. 22, 2023

(87) PCT Pub. No.: WO2024/087018

PCT Pub. Date: May 2, 2024

(65) Prior Publication Data

US 2025/0038414 A1 Jan. 30, 2025

(51) Int. Cl.
*H01Q 21/00* (2006.01)
*H01Q 1/22* (2006.01)
(Continued)

(52) U.S. Cl.
CPC ........... *H01Q 21/0087* (2013.01); *H01Q 1/22* (2013.01); *H01Q 1/38* (2013.01); *H01Q 1/48* (2013.01);
(Continued)

(58) Field of Classification Search
CPC ........ H01Q 21/0087; H01Q 1/22; H01Q 1/38; H01Q 1/48; H01Q 9/0414; H01Q 21/065; H01Q 1/36; Y10T 29/49016
See application file for complete search history.

(56) References Cited

U.S. PATENT DOCUMENTS 4,937,585 A * 6/1990 Shoemaker ........ H01Q 21/0087 343/777
2016/0126614 A1* 5/2016 Lim ........................ H01Q 1/36 343/720

FOREIGN PATENT DOCUMENTS

CN 111370854 A 7/2020
JP 2010263413 A * 11/2010

OTHER PUBLICATIONS

Hsu et al, "Fabrication of patterned array of alumina-metal coaxial nanorods," 2009 Symposium on Design, Test, Integration & Packaging of MEMS/MOEMS, Rome, Italy, 2009, pp. 117-121. (Year: 2009).*

(Continued)

*Primary Examiner* — A. Dexter Tugbang
(74) *Attorney, Agent, or Firm* — WHDA, LLP

(57) ABSTRACT

Provided are a millimeter wave antenna and a preparation method thereof, an electronic device and a driving method thereof, relating to the field of display technology. The preparation method of the millimeter wave antenna includes: providing a first baseboard; forming a definition layer on the first baseboard; treating the definition layer to enable the definition layer to have a plurality of through holes; forming an electrode layer in each of the through holes of the
(Continued)

definition layer; the electrode layer includes a radiation pattern and a feeder, and both the radiation pattern and the feeder include a mesh structure.

14 Claims, 12 Drawing Sheets

(51) Int. Cl.
*H01Q 1/38* (2006.01)
*H01Q 1/48* (2006.01)
*H01Q 9/04* (2006.01)
*H01Q 21/06* (2006.01)

(52) U.S. Cl.
CPC ......... *H01Q 9/0414* (2013.01); *H01Q 21/065* (2013.01); *Y10T 29/49016* (2015.01)

(56) References Cited

OTHER PUBLICATIONS

Machine Translation of CN 111370854, Sep. 2025. (Year: 2025).*
Extended (Supplementary) European Search Report dated Jun. 23, 2025, issued in counterpart EP Application No. 22963005.8. (25 pages).

* cited by examiner

PREPARATION METHOD FOR ELECTRONIC DEVICE AND MILLIMETER WAVE ANTENNA

TECHNICAL FIELD

The present disclosure relates to the field of display technology, in particular to a millimeter wave antenna and a preparation method thereof, an electronic device and a driving method thereof.

BACKGROUND

With the development of science and technology, antenna on display (AoD) technology came into being. In the AoD technology, antennas are provided in a display area of an electronic device to increase a coverage of the antennas by sacrificing a part of loss, thereby achieving better radiation.

However, since the antenna in the AoD technology is located in the display area of the screen, it is crucial to ensure the radiation performance of the antenna without affecting the display of the electronic device.

Therefore, there is an urgent need to provide an electronic device that satisfies the above performance.

SUMMARY

Embodiments of the present disclosure adopt technical solutions described below.

In an aspect, an embodiment of the present disclosure provide a method for preparing a millimeter wave antenna, including:

providing a first baseboard;

forming a definition layer on the first baseboard;

treating the definition layer to enable the definition layer to have a plurality of through holes; and forming an electrode layer in each of the through holes of the definition layer; the electrode layer includes a radiation pattern and a feeder, and both of the radiation pattern and the feeder include a mesh structure.

In some embodiments, the forming a definition layer on the first baseboard includes forming at least a first planarization layer on the first baseboard; the treating the definition layer to enable the definition layer to have a plurality of through holes includes treating at least the first planarization layer to enable the first planarization layer to have a plurality of through holes; the forming an electrode layer in each of the through holes of the definition layer includes forming the electrode layer at least in each of the through holes of the first planarization layer.

In some embodiments, the forming at least a first planarization layer on the first baseboard includes forming the first planarization layer on the first baseboard; the treating at least the first planarization layer to enable the first planarization layer to have a plurality of through holes includes treating the first planarization layer to enable the first planarization layer to have a plurality of through holes; the forming the electrode layer at least in each of the through holes of the first planarization layer includes forming the electrode layer in each of the through holes of the first planarization layer.

In some embodiments, the forming at least a first planarization layer on the first baseboard includes:

forming a first buffer layer on the first baseboard;

forming the first planarization layer on the first buffer layer; and forming a mask layer on the first planarization layer;

the treating at least the first planarization layer to enable the first planarization layer to have a plurality of through holes includes:

treating at least two of the first buffer layer, the first planarization layer and the mask layer simultaneously to enable all of the first buffer layer, the first planarization layer and the mask layer to have a plurality of through holes;

the forming the electrode layer at least in each of the through holes of the first planarization layer includes:

forming the electrode layer at least in each of the through holes of the first buffer layer and in each of the through holes of the first planarization layer.

In some embodiments, the treating at least two of the first buffer layer, the first planarization layer and the mask layer simultaneously to enable all of the first buffer layer, the first planarization layer and the mask layer to have a plurality of through holes includes:

treating the mask layer, the first planarization layer and the first buffer layer in sequence simultaneously to enable all of the mask layer, the first planarization layer and the first buffer layer to have a plurality of through holes;

the forming the electrode layer at least in each of the through holes of the first buffer layer and in each of the through holes of the first planarization layer includes:

forming the electrode layer in each of the through holes of the mask layer, each of the through holes of the first planarization layer, and each of the through holes of the first buffer layer.

In some embodiments, materials of the mask layer include non-metal.

In some embodiments, the treating at least two of the first buffer layer, the first planarization layer and the mask layer simultaneously to enable all of the first buffer layer, the first planarization layer and the mask layer to have a plurality of through holes includes:

treating the mask layer to enable the mask layer to have a plurality of through holes; and treating the first planarization layer and the first buffer layer in sequence simultaneously to enable both of the first planarization layer and the first buffer layer to have a plurality of through holes;

the forming the electrode layer at least in each of the through holes of the first buffer layer and in each of the through holes of the first planarization layer includes:

removing the mask layer; and forming the electrode layer in each of the through holes of the first planarization layer and in each of the through holes of the first buffer layer.

In some embodiments, the treating at least two of the first buffer layer, the first planarization layer and the mask layer simultaneously to enable all of the first buffer layer, the first planarization layer and the mask layer to have a plurality of through holes includes:

treating the mask layer, the first planarization layer and the first buffer layer in sequence simultaneously to enable all of the mask layer, the first planarization layer and the first buffer layer to have a plurality of through holes;

the forming the electrode layer at least in each of the through holes of the first buffer layer and in each of the through holes of the first planarization layer includes:

removing the mask layer; and forming the electrode layer in each of the through holes of the first planarization layer and in each of the through holes of the first buffer layer.

In some embodiments, materials of the mask layer include metal.

In some embodiments, after providing the first baseboard and before forming the definition layer on the first baseboard, the method further includes:

forming a surface seed layer on the first baseboard.

In some embodiments, after forming the electrode layer in each of the through holes of the definition layer, the method further includes:

forming a second planarization layer on the electrode layer.

In some embodiments, after forming the second planarization layer on the electrode layer, the method further includes:

forming a second baseboard on the second planarization layer.

In some embodiments, after providing the first baseboard and before forming the surface seed layer on the first baseboard, the method further includes:

forming a peeling layer on the first baseboard;

after forming the second baseboard on the second planarization layer, the method further includes:

removing the peeling layer and the first baseboard.

In some embodiments, after forming the second baseboard on the second planarization layer, the method further includes:

forming a second protective layer on the second baseboard.

In another aspect, an embodiment of the present disclosure provides a millimeter wave antenna prepared by the above-mentioned millimeter wave antenna preparation method, including:

a first baseboard;

a definition layer, disposed on the first baseboard and including a plurality of through holes;

an electrode layer disposed in each of the through holes of the definition layer, wherein the electrode layer includes a radiation pattern and a feeder, and both of the radiation pattern and the feeder include a mesh structure.

In some embodiments, the definition layer includes at least a first planarization layer; the first planarization layer includes a plurality of through holes, and the electrode layer is at least disposed in each of the through holes of the first planarization layer.

In some embodiments, the definition layer include at least a first planarization layer; the first planarization layer includes a plurality of through holes, and the electrode layer is disposed in each of the through holes of the first planarization layer.

In some embodiments, the definition layer further includes a first buffer layer and a mask layer, wherein the first buffer layer is disposed between the first baseboard and the first planarization layer, and the mask layer is disposed on a side of the first planarization layer facing away from the first baseboard; all of the first buffer layer, the first planarization layer and the mask layer have a plurality of through holes, and the electrode layer is disposed in each of the through holes of the mask layer, in each of the through holes of the first planarization layer, and in each of the through holes of the first buffer layer.

In some embodiments, the definition layer further includes a first buffer layer disposed between the first baseboard and the first planarization layer; both of the first buffer layer and the first planarization layer includes a plurality of through holes, and the electrode layer is disposed in each of the through holes of the first planarization layer and in each of the through holes of the first buffer layer.

In yet another aspect, an embodiment of the present disclosure provides an electronic device, including the above-mentioned millimeter wave antenna.

In some embodiments, the electronic device includes a display device with a display panel, the display panel includes a display baseboard and the millimeter wave antenna described above, the millimeter wave antenna is disposed on a light emitting side of the display baseboard.

In some embodiments, the display panel further includes a touch layer, wherein the touch layer is disposed between the display baseboard and the millimeter wave antenna; or the touch layer is disposed on a side of the millimeter wave antenna facing away from the display baseboard.

In some embodiments, the display panel further includes a first polarizing unit and a cover plate; the first polarization unit is disposed on a side of the millimeter wave antenna facing away from the display baseboard; the cover plate is disposed on a side of the first polarizing unit facing away from the display baseboard.

In some embodiments, the display device further includes a first controller and a second controller, the first controller is electrically connected to the display baseboard and configured to control the display baseboard; the second controller is electrically connected to the millimeter wave antenna and configured to control the millimeter wave antenna.

In some embodiments, the display panel includes a display area and a border area connected to the display area, the millimeter wave antenna and the display baseboard are both located in the display area and the border area; the first controller is bonded to the display baseboard located in the border area; the millimeter wave antenna further extends from the border area of the display panel in a direction facing away from the display area, a part of the millimeter wave antenna extending out of the display panel comprises a bending area and a non-bending area, the bending area is located between the non-bending area and the border area of the display panel; the second controller is located in the non-bending area, and is bonded to the part of the millimeter wave antenna located in the non-bending area.

In some embodiments, the electronic device further includes a ground layer, the ground layer is disposed on a side close to the first baseboard of the part of the millimeter wave antenna extending out the display panel, and the ground layer is located in the non-bending area and the bending area; the electrode layer in the millimeter wave antenna is also disposed on a side of the second controller facing away from the ground layer, and is located in the bending area and the non-bending area. The electrode layer is configured to be bent in the bending area together with the ground layer.

In some embodiments, the display panel includes a display area and a border area connected to the display area, and the millimeter wave antenna and the display baseboard are located are both located in the display area and the border area; the first controller is bonded to the display baseboard located in the border area; a part of the second controller is located in the border area, and is bonded to the millimeter wave antenna located in the border area.

In some embodiments, a remaining part of the second controller extends from the border area of the display panel in a direction facing away from the display area, and includes a bending area and a non-bending area, the bending area is located between the non-bending area and the border area of the display panel; the display device further includes a ground layer, the ground layer is provided on a side of the second controller close to the first baseboard, and a gap exists between the ground layer and the border area, the ground layer is located in the non-bending area and a part of the bending area; the electrode layer in the millimeter wave antenna is also disposed on a side of the second controller facing away from the ground layer, and located in the bending area and the non-bending area, the electrode layer in the millimeter wave antenna is configured to be bent in the bending area together with the remaining part of the second controller and the ground layer.

In yet another aspect, an embodiment of the present disclosure provides a method for driving the above-mentioned electronic device, including:

controlling, by the first controller, the display baseboard to display;

controlling, by the second controller, the millimeter wave antenna to radiate.

The above explanation is merely an overview of the technical solutions of the present disclosure. In order to know about the technical means of the present disclosure more clearly so that the solutions according to the contents of the specification may be implemented, and in order to make the above and other objects, features and advantages of the present disclosure more apparent and understandable, specific implementations of the present disclosure are set forth below.

BRIEF DESCRIPTION OF THE DRAWINGS

In order to describe technical solutions of the embodiments of the present disclosure or the related art more clearly, the accompanying drawings used in the illustration of the embodiments or the related art will be briefly introduced. Apparently, the accompanying drawings in the following explanation illustrate merely some embodiments of the present disclosure, and those skilled in the art may obtain other accompanying drawings based on these accompanying drawings without paying any creative effort.

DETAILED DESCRIPTION OF THE EMBODIMENTS

Figure 1:
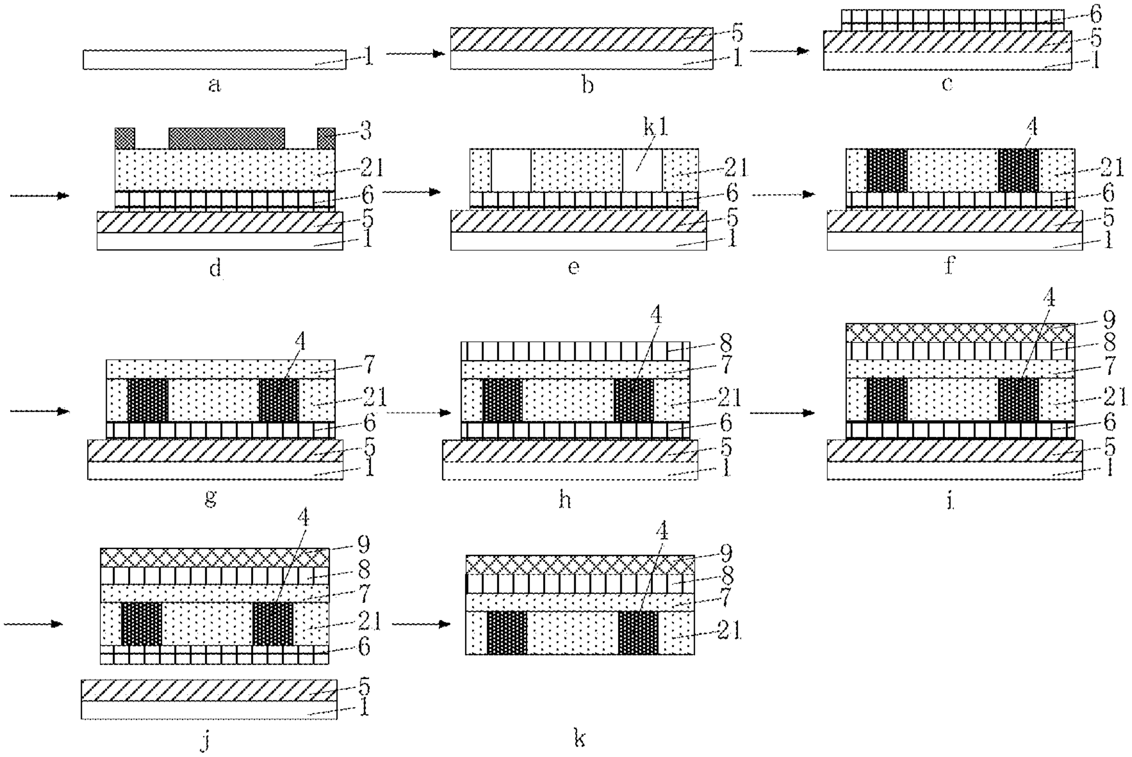
FIG. 1 is a flow chart of a method for preparing a first millimeter wave antenna provided by an embodiment of the present disclosure.

In order to make objects, solutions and advantages of embodiments of the present disclosure clearer, a clear and thorough description for technical solutions in the embodiments of the present disclosure will be given below in conjunction with the accompanying drawings in the embodiments of the present disclosure. Apparently, the described embodiments are a part of embodiments of the present disclosure, not all the embodiments. All other embodiments obtained, based on the embodiments in the present disclosure, by those skilled in the art without paying creative effort fall within the protection scope of the present disclosure.

In the drawings, thicknesses of regions and layers may be exaggerated for clarity. Same or similar structures are indicated with the same reference numeral, and the detailed descriptions thereof will be omitted. In addition, the drawings are merely schematic illustrations of the present disclosure and are not necessarily drawn to scale.

In the embodiments of the present application, unless otherwise specified, "plurality" means two or more. The orientation or positional relationship indicated by the term "above" is based on the orientation or positional relationship shown in the drawings, and is only for the convenience of describing the present disclosure and simplifying the description, rather than indicating or implying that the structure or element referred to must have a specific orientation, be constructed and operated in a specific orientation, and therefore cannot be construed as a limitation on the present application.

Unless it is additionally defined in the context, otherwise, the term “comprising/including” throughout the specification and claims is interpreted in an open and inclusive sense, that is. “including, but not limited to”. In the description of the specification, the terms “an embodiment”, “some embodiments”, “an exemplary embodiment”, “an example”, “specific examples” or “some examples” are intended to indicate that specific features, structures, materials or characteristics related to the embodiment or example are included in at least one embodiment or example of the present disclosure. Schematic representations of the above terms do not necessarily refer to the same embodiment or example. Furthermore, the particular features, structures, materials or characteristics described may be included in any suitable manner in any one or more embodiments or examples.

In the embodiments of the present disclosure, wordings such as “first” and “second” are used to distinguish the same or similar items with basically the same function and effect, and are only used for clearly describing the technical solutions of the embodiments of the present application, and cannot be understood as indicating or implying relative importance or implicitly indicating the number of indicated technical features.

Millimeter waves (mmWave) usually refer to radio waves with a frequency range of 30 to 300 GHz and a wavelength range of 1 to 10 mm. Of course, the frequency range of the usual 15 mmWave may also be expanded to 24 to 30 GHz. Millimeter waves can better realize ultra-high-speed 5G (5th Generation Mobile Communication Technology) and have a wider bandwidth. However, due to the short wavelength, the mmWave cannot effectively pass through some materials, such as metal materials. As a result, the application of mmWave is subject to certain limitations and cannot achieve a high-speed and low-latency 5G experience.

At present, there is proposed an AiP (Antenna In Package) technology that integrates the antenna with the radio frequency transceiver chip to minimize the transmission loss of the mmWave as much as possible. However, the location of the antenna is limited in AiP, for example, in related technologies, the antennas of the electronic device are generally located in the frame area or the back of the screen. As a result, in addition to the complex electromagnetic environment of the electronic device when it is used, signals will also be blocked due to the users holding manner, leading to problems such as interruption of radio wave transmission and interruption of 5G stability.

In order to solve the above problems, AoD technology came into being. On the basis of the AiP technology, AoD technology is obtained by separating the antenna from the packaging carrier board and moving the antenna to the display area of the screen, so as to increase the coverage area of the antenna by sacrificing a part of loss. Since the antenna in the AoD technology is located in the display area of the screen, it is particularly important to ensure good radiation performance of the antenna without affecting the display of the screen.

In view of the above, an embodiment of the present disclosure provides a method for preparing a millimeter wave antenna, including steps described below.

At S1, a first baseboard is provided.

The first baseboard is of many types, which can be selected and set according to actual needs. As an example, the first baseboard may be a rigid baseboard, and the material of the rigid baseboard may include, for example, glass. PC (Polycarbonate), COP (Copolymers of Cycloolefin), PMMA (Polymethyl Methacrylate), PET (Polyethylene Terephthalate), etc. As an example, the first baseboard may be a flexible baseboard, and the material of the flexible baseboard may include, for example, PI (Polyimide), PEN (Polyethylene Naphthalate Two Formic Acid Glycol Ester) and the like.

The structure of the first baseboard is not specifically limited. For example, other film layers may be formed directly on the first baseboard; or, the first baseboard may include a substrate, on which other film layers may be directly formed, which is determined according to the actual application.

At S2, a definition layer is formed on the first baseboard.

The structure of the definition layer is not specifically limited here. For example, the definition layer may merely include one layer, e.g., the definition layer shown in FIG. 1 includes a first planarization layer 21); or, the definition layer may include multiple layers, e.g., the definition layer shown in FIG. 2 includes a first buffer layer 22, a first planarization layer 21 and a mask layer 23 that are stacked in sequence. Of course, the definition layer may also include other film layers, depending on the actual application.

There are no specific limitations on the preparation process, materials, etc. of the definition layer, which can be determined according to the structure of the definition layer.

At S3, the definition layer is treated to have multiple through holes.

The process of treating the definition layer is not specifically limited, and can be determined according to the structure of the definition layer. For example, as shown in FIG. 1, photoresist 3 may be coated on the first planarization layer 21, and a mask (not shown in the figure) is used to pattern the first planarization layer 21 to form multiple through holes k1 of the first planarization layer 21.

The shape, depth and the like of the through holes are not specifically limited here, and can be determined according to the process of treating the definition layer.

At S4, an electrode layer is formed in the through holes in the definition layer.

The electrode layer includes a radiation pattern and a feeder, and both the radiation pattern and the feeder include a mesh structure.

The material of the electrode layer is not specifically limited here. For example, the material of the electrode layer may be a metal material, such as copper, titanium, magnesium, etc.; or glass fiber with a metal coating; or resin that is coated with conductive carbon materials at the surface thereof, and the conductive carbon materials include graphene, carbon fiber, and carbon nanotubes.

The process for forming the electrode layer is not specifically limited here. For example, the above electrode layer may be formed using processes such as electroplating and deposition. The advantages of the electroplating process are illustrated by taking the electrode layer of metal material as an example: due to the low deposition efficiency of sputtering, in order to achieve narrow line width and thick metal with a high aspect ratio, electroplating needs to be used for rapid metal growth. Since the area to be plated (that is, the previously patterned area) has been defined by the definition layer and other films, the electroplated metal can only grow along the inside of the through hole and will not grow on the surface of the definition layer and other films.

The number of the feeders is not specifically limited, and can be determined according to the type of mmWave antenna, specific conditions, etc. For example, in the case that the mmWave antenna is a dual-polarized antenna, the number of the feeders may be two; or, in the case that nmWave antenna is not the dual-polarized antenna, the number of the feeders may be one. Of course, the number of the feeders may also be three or more, depending on the actual application.

Both the radiation pattern and the feeder include a mesh structure, and the mesh structure may be a metal mesh structure. The line width of the metal mesh of the radiation pattern and the feeder is not specifically limited here. For example, the line width of the grid line of the radiation pattern and the feeder may both range from 0.5 to 2 μm, specifically 0.5 μm, 0.8 μm, 1 μm, 1.5 μm, 1.7 μm or 2 μm, etc.

The thickness of the mesh structure is not specifically limited here, and can be controlled by the thickness of the definition layer. The thickness range of the mesh structure is explained by assuming that the material of the electrode layer is metal: considering the unevenness of electroplating, for example, the thickness of the electroplated metal may be 80~90% of the thickness of the definition layer. This is because that a thin metal will affect the radiation efficiency, and a thick metal will seriously affect the transmittance. For example, a ratio range of the thickness of the mesh structure in a direction perpendicular to the first baseboard to the line width of the mesh structure can be greater than or equal to 2. For example, the aspect ratio of the mesh structure may be 2, 3, 4, 5, 6 or 7 and so on.

There is no specific limitation on the spacing between adjacent grid lines in the mesh structure. For example, the spacing between adjacent grid lines in the mesh structure may be in a range of 20~250 μm, preferably 5%-200 μm, specifically 50 k m, 100 μm or 200 μm, etc.

There is no specific limitation on the light transmittance of the mesh structure. For example, the light transmittance of the mesh structure may be greater than 80%. For example, the light transmittance range is 86~92%, specifically 86%, 87%, 88%, 89%, 90%, 91% or 92%, etc.

The line width of the grid lines of the radiation pattern may be set to be smaller than the spacing between adjacent grid lines of the radiation pattern, and the thickness of the radiation pattern in a direction perpendicular to the first baseboard may be set to be greater than the line width of the grid lines of the radiation pattern. The line width of the grid lines of the feeder may be set to be smaller than the spacing between adjacent grid lines of the radiation pattern, and the thickness of the feeder in a direction perpendicular to the first baseboard may be set to be greater than the line width of the grid lines of the radiation pattern.

On the one hand, by configuring the radiation pattern and the feeder as a mesh structure, and providing a non-opaque first baseboard, etc., an electrode layer with a better light transmittance performance can be obtained. On the other hand, by adjusting the line width and thickness of the mesh structure, it is possible to obtain an electrode layer with a high aspect ratio to ensure the radiation of the antenna, and it is also possible to further improve the light transmission performance of the electrode layer without affecting the electrical performance of each radiation pattern, thereby improving the light transmission performance of the mmWave antenna. Thus, the mmNWave antenna can be better used in the display area of the electronic device.

It should be noted that the specific line widths of the grid lines of the radiation pattern and the feeder, the specific dimensions of the spacing between adjacent grid lines, their respective specific thicknesses in the direction perpendicular to the first baseboard, etc. may be the same, or they may be different.

The preparation method of a mmWave antenna provided by the embodiment of the present disclosure includes: providing a first baseboard; forming a definition layer on the first baseboard; treating the definition layer to have multiple through holes; and forming an electrode layer in the through holes of the definition layer; the electrode layer includes a radiation pattern and a feeder, and both the radiation pattern and the feeder include a mesh structure. In this way, on the one hand, since the electrode layer is arranged in the through hole of the definition layer, the thickness of the electrode layer along the direction perpendicular to the first baseboard can be controlled according to the thickness of the through hole of the definition layer along the direction perpendicular to the first baseboard, and the width of the electrode layer along the direction parallel to the first baseboard can be controlled according to the width of the through hole of the definition layer along the direction parallel to the first baseboard, thereby obtaining an electrode layer with a high aspect ratio, that is, both the radiation pattern and the feeder in the mmWave antenna have a high aspect ratio, so that the mmWave antenna can radiate effectively; moreover, when the mmWave antenna with extremely narrow line width is used in an electronic device, for example when it is integrated into a display device, the impact on the display function of the display device can be greatly reduced or even eliminated. On the other hand, the light transmittance of the electrode layer can be effectively increased by configuring both the radiation pattern and feeder as a mesh structure, so that the mmWave antenna as a whole has a transparent effect with excellent light transmittance, and the light transmittance range can reach 86~92%, which is more conducive to the application of the mmWave antenna in a display device.

Optionally, the step of S2, in which the definition layer is formed on the first baseboard, includes S21 of:

forming at least a first planarization layer on the first baseboard.

Figure 2:
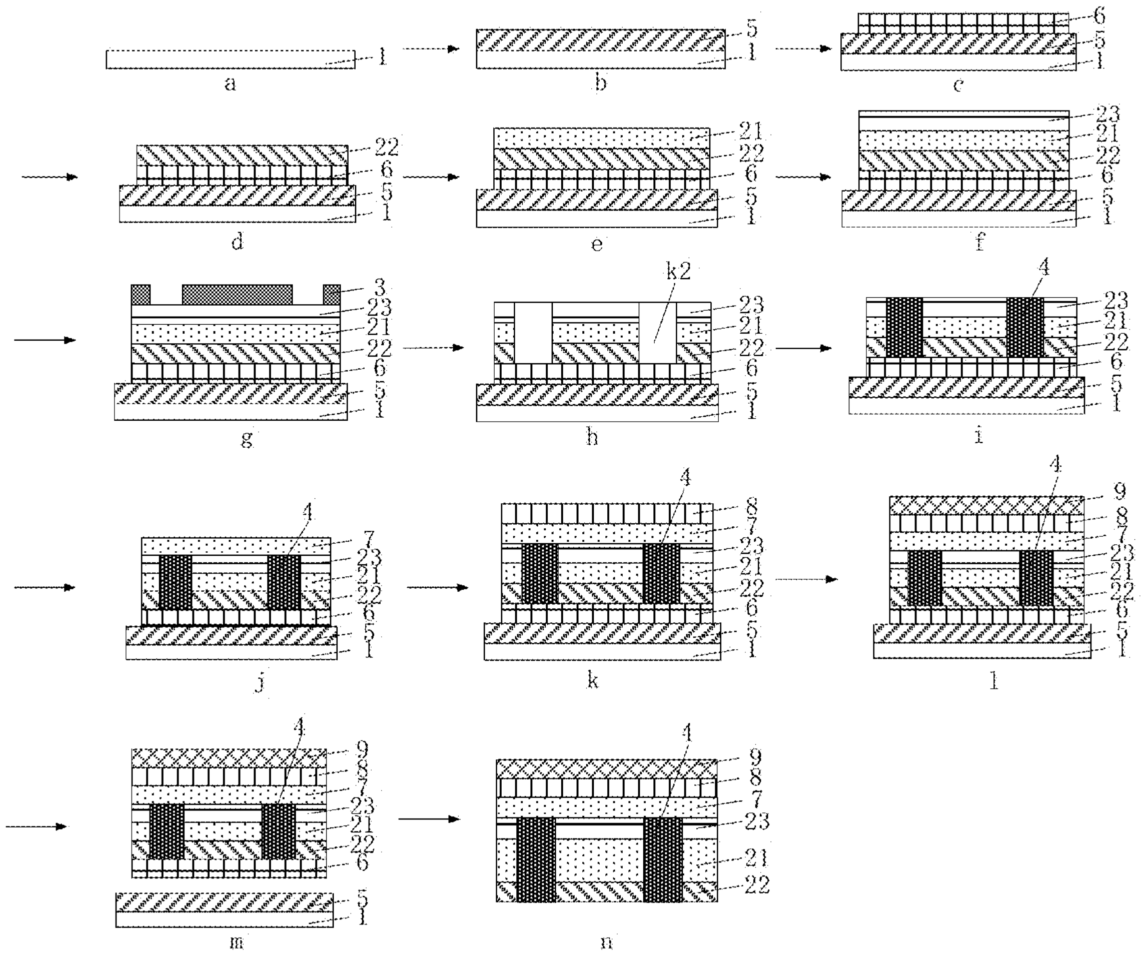
FIG. 2 is a flow chart of a method for preparing a second millimeter wave antenna provided by an embodiment of the present disclosure.
Figure 3:
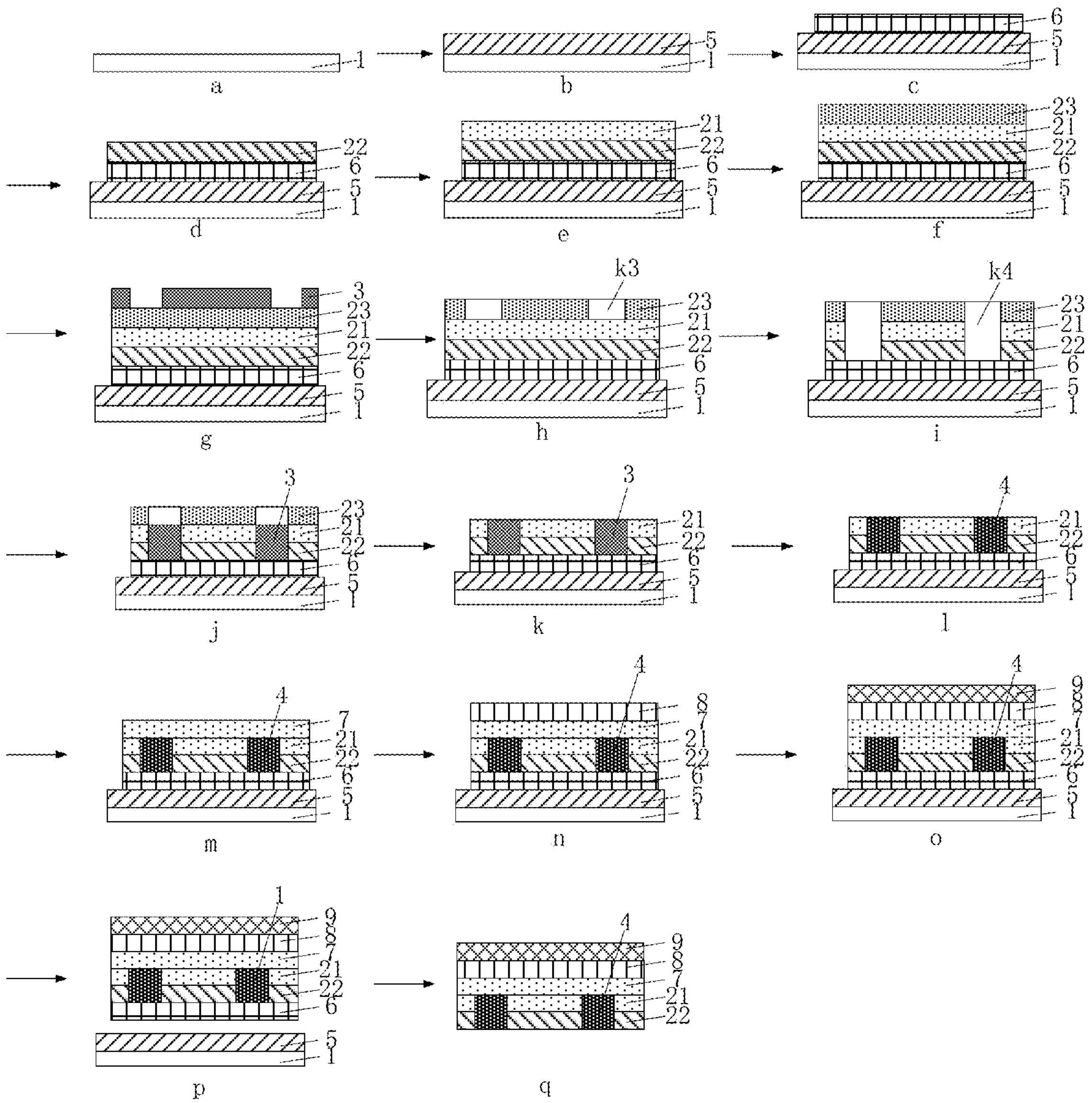
FIG. 3 is a flow chart of a method for preparing a third millimeter wave antenna provided by an embodiment of the present disclosure.
Figure 4:
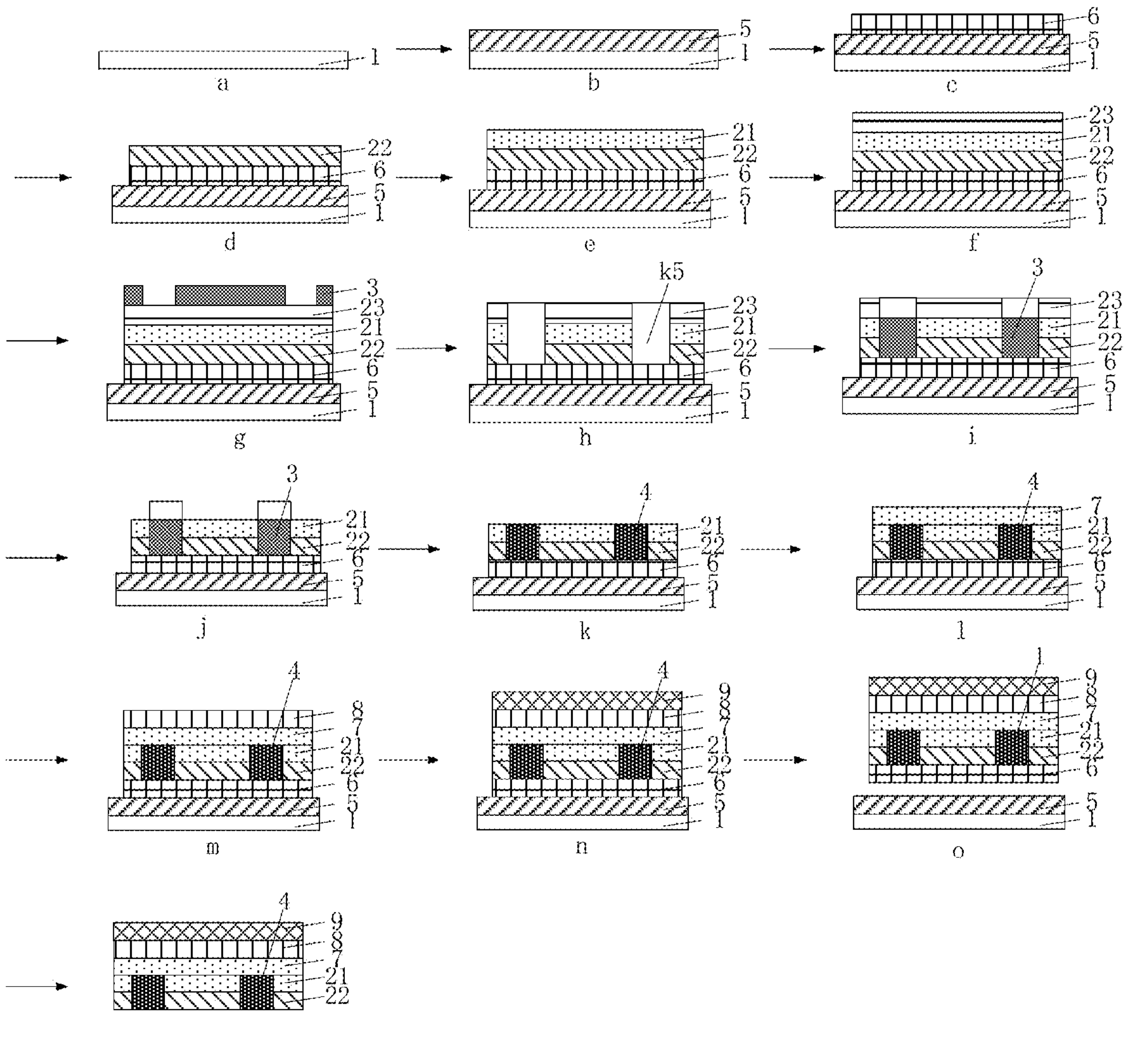
FIG. 4 is a flow chart of a method for preparing a fourth millimeter wave antenna provided by an embodiment of the present disclosure.

The forming at least a first planarization layer on the first baseboard means: referring to FIG. 1, only forming the first planarization layer 21 on the first baseboard 1; or, in addition to the first planarization layer, other film layers, such as the first buffer layer and the mask layer shown in FIG. 2 to FIG. 4, may also be formed on the first baseboard, which are not limited here.

The step of S3, in which the definition layer is treated to have multiple through holes, includes:

at S31, treating at least the first planarization layer to have a plurality of through holes.

The treating at least the first planarization layer to enable the first planarization layer to have a plurality of through holes means: only treating the first planarization layer to have a plurality of through holes; or, in addition to treating the first planarization layer to have multiple through holes, other film layers can also be treated to enable both the first planarization layer and other film layers to have multiple through holes, which is not limited here.

The step of S4, in which an electrode layer is formed in the through holes in the definition layer, includes:

at S41, forming an electrode layer in at least each through hole in the first planarization layer.

The forming an electrode layer in at least each through hole in the first planarization layer means: only forming the electrode layer in each through hole in the first planarization layer; or, forming the electrode layer in each through hole in the first planarization layer and other film layers, which is not limited here.

In the preparation method of the mmWave antenna provided by the embodiment of the present disclosure, the electrode layer is at least formed in each through hole of the first planarization layer, the thickness of the electrode layer along the direction perpendicular to the first baseboard can be controlled at least according to the thickness of the through hole in the first planarization layer in the direction perpendicular to the first baseboard, and the width of the electrode layer along the direction parallel to the first baseboard is controlled at least according to the width of the through hole in the first planarization layer along the direction parallel to the first baseboard, thereby obtaining an electrode layer with a high aspect ratio, that is, both the radiation pattern and the feeder in the mmWave antenna have a high aspect ratio, so that the mmWave antenna can radiate effectively. Moreover, when the mmNWave antenna with extremely narrow line width is used in an electronic device, for example when it is integrated into a display device, the impact on the display function of the display device can be greatly reduced or even eliminated.

In some embodiments, the step of forming at least a first planarization layer on the first baseboard in S21 includes S211 of:

referring to the graph d of FIG. 1, forming the first planarization layer 21 on the first baseboard 1.

The material of the first planarization layer is not specifically limited here. For example, the material of the first planarization layer may include high-temperature stable photoresist (OC for short), and the high-temperature stable photoresist also has a transmittance that is greater than 90%. For example, the material of the first planarization layer may include highly transparent photoresist or organic materials.

The preparation process of the first planarization layer is not specifically limited here. For example, the first planarization layer may be formed by depositing a transparent photoresist on the first baseboard through a deposition process.

When the antenna in the related art has a high aspect ratio, the structural stability thereof is not good. Especially when the aspect ratio is large, taking the electrode layer having the metal material as an example, the contact area between the metal and the bottom surface is limited, thus the center of gravity is high, collapse or disconnection is prone to occur. Moreover, the uniformity of wet etching is poor, resulting in low antenna yield. Then, in order to realize a transparent antenna with a high aspect ratio, the metal grid lines of the electrode layer need to be reinforced. The function of the first planarization layer is to improve the uniformity of wet etching and ensure that the electroplated metal to grow in a specified direction. Therefore, the width and thickness of the mmWave antenna provided by the embodiment of the present disclosure can be controlled through the first planarization layer The step of treating at least the first planarization layer to have a plurality of through holes in S31 includes the step described below.

At S311, referring to the graph e of FIG. 1, the first planarization layer 21 is treated to have a plurality of through holes k1.

The step of forming an electrode layer in at least each through hole in the first planarization layer in S41 includes steps described below.

At S411, as shown in graph f of FIG. 1, an electrode layer 4 is formed in each through hole of the first planarization layer 21.

The process of forming the electrode layer in each through hole of the first planarization layer is not specifically limited. For example, an electroplating process may be used to form the electrode layer in each through hole in the first planarization layer.

In the preparation method of the mmWave antenna provided by the embodiment of the present disclosure, the electrode layer is formed in each through hole of the first planarization layer, the thickness of the electrode layer along the direction perpendicular to the first baseboard can be controlled according to the thickness of the through hole in the first planarization layer along the direction perpendicular to the first baseboard, and the width of the electrode layer along the direction parallel to the first baseboard is controlled according to the width of the through hole in the first planarization layer along the direction parallel to the first baseboard, thereby obtaining an electrode layer with a high aspect ratio, that is, both the radiation pattern and the feeder in the mmWave antenna have a high aspect ratio, so that the mmWave antenna can radiate effectively. Moreover, when the mmWave antenna with extremely narrow linewidth is used in an electronic device, for example when it is integrated into a display device, the impact on the display function of the display device can be greatly reduced or even eliminated.

In some embodiments, the step of forming at least a first planarization layer on the first baseboard in S21 includes steps described below.

At S212, as shown in graph d of FIG. 2, a first buffer layer 22 is formed on the first baseboard 1.

The material of the first buffer layer is not specifically limited here. For example, the material of the first buffer layer may include silicon nitride (SiN), silicon oxide (SiO), silicon oxynitride (SiON), laminated silicon nitride and silicon oxide (two or more layers of SiN/SiO), etc.

The preparation process of the first buffer layer is not specifically limited here. For example, the first buffer layer may be prepared by the PECVD (Plasma Enhanced Chemical Vapor Deposition), deposition process and the like.

It should be noted that before depositing the material of the first buffer layer on the first baseboard, a surface treatment may be conducted on the first baseboard with ammonia gas (NH3). Of course, in the case that other film layers are provided between the first baseboard and the first buffer layer, before depositing the material of the first buffer layer, a surface treatment may be conducted on the film layer in contact with the first buffer layer with ammonia gas.

At S213, as shown in graph e of FIG. 2, the first planarization layer 21 is formed on the first buffer layer 22.

At S214, as shown in graph f of FIG. 2, a mask layer 23 is formed on the first planarization layer 21.

The material of the mask layer is not specifically limited here. For example, the material of the mask layer may include metals, such as ITO (Indium Tin Oxides), molybdenum (Mo), molybdenum/aluminum/molybdenum (Mo/Al/Mo), titanium/aluminum/titanium (Ti/Al/Ti), etc. For example, the material of the mask layer may include non-metals, such as organic materials.

The preparation process of the mask layer is not specifically limited here. For example, the mask layer may be prepared using a deposition process.

The step of treating at least the first planarization layer to have a plurality of through holes in S31 includes the step described below.

At S312, at least two of the first buffer layer, the first planarization layer and the mask layer are treated at the same time to enable the first buffer layer, the first planarization layer and the mask layer each to have a plurality of through holes.

The step, in which at least two of the first buffer layer, the first planarization layer and the mask layer are treated at the same time to enable the first buffer layer, the first planarization layer and the mask layer each to have a plurality of through holes, means: treating two of the first buffer layer, the first planarization layer and the mask layer at the same time to enable the first buffer layer, the first planarization layer and the mask layer each have a plurality of through holes; or, in addition to treating two of the first buffer layer, the first planarization layer and the mask layer at the same time, treating the other film layer, such as the mask layer, at the same time, to enable the first buffer layer, the first planarization layer and the mask layer each have a plurality of through holes.

The step of forming an electrode layer in at least each through hole in the first planarization layer in S41 includes the step described below.

At S412, the electrode layer is at least formed in each through hole of the first buffer layer and in each through hole of the first planarization layer.

In the preparation method of the mmWave antenna provided by the embodiment of the present disclosure, the electrode layer is formed at least in each through hole of the first buffer layer and in each through hole of the first planarization layer, the thickness of the electrode layer along the direction perpendicular to the first baseboard can be controlled according to the thickness of the through holes in the first planarization layer and the first buffer layer along the direction perpendicular to the first baseboard, and the width of the electrode layer along the direction parallel to the first baseboard is controlled according to the width of the through holes in the first planarization layer and the first buffer layer along the direction parallel to the first baseboard, thereby obtaining an electrode layer with a high aspect ratio, that is, both the radiation pattern and the feeder in the mmWave antenna have a high aspect ratio, so that the mmWave antenna can radiate effectively. Moreover, when the mmWave antenna with extremely narrow linewidth is used in an electronic device, for example when it is integrated into a display device, the impact on the display function of the display device can be greatly reduced or even eliminated. Furthermore, the first buffer layer can improve the adhesion between the electrode layer and subsequent film layers.

In some embodiments, the step of S312, in which at least two of the first buffer layer, the first planarization layer and the mask layer are treated at the same time to enable the first buffer layer, the first planarization layer and the mask layer each to have a plurality of through holes, includes the step described below.

At S3121, as shown in graph h of FIG. 2, the mask layer 23, the first planarization layer 21 and the first buffer layer 22 are simultaneously treated in sequence to enable all of the mask layer 23, the first planarization layer 21 and the first buffer layer 22 to have multiple through holes k2.

There is no specific limitation on the process of simultaneously treating the mask layer, the first planarization layer and the first buffer layer in sequence. For example, dry etching can be used to simultaneously treat the mask layer, the first planarization layer and the first buffer layer in sequence. Specifically, the same equipment may be used to etch, and the mask layer, the first planarization layer and the first buffer layer may be etched through dry etching. The etching time may be proportional to the thickness of each film layer, for example, for the first buffer layer of 1000 Å/the first planarization layer of 4 μm/the mask layer of 2000 Å, the etching time is 30 s/110 s/80 s. The etching time may be adjusted according to different equipment and different thicknesses of various film layer. Due to uneven etching, the etching time of the first buffer layer can be appropriately reduced, and the first buffer layer does not need to be completely etched to prevent the film layer between the first buffer layer and the first baseboard from being over-etched. For example, assuming the complete etching time of the first buffer layer of 1000 Å is 40 seconds, the first buffer layer may be etched for 30 seconds, as long as the first buffer layer can be etched through, and the remaining unetched material of the first buffer layer will not affect the subsequent process.

The above etching process is not specifically limited here. For example, the above etching process may include Reactive ion etching, ICP (Inductively Coupled Plasma Etching), etc. Reactive ion etching is isotropic etching, so there will be a certain amount of side etching as the etching time increases, making the mesh structure appear a trapezoid with a wide top and narrow bottom. The slope angle of the trapezoid is about 78°. ICP can etch approximately 90° rectangular grooves. In FIG. 1 to FIG. 4, as an example, the shape of the through hole is drawn as a rectangular slot.

The step of S412, in which the electrode layer is at least formed in each through hole of the first buffer layer and in each through hole of the first planarization layer, includes the step described below.

At S4121, as shown in graph i of FIG. 2, the electrode layer 4 is formed in each through hole of the mask layer 23, each through hole of the first planarization layer 21, and each through hole of the first buffer layer 22.

The process of forming the electrode layer in the through holes of the mask layer, the through holes of the first planarization layer and the through holes of the first buffer layer is not specifically limited here. As an example, an electroplating process can be used to form the electrode layer in the through holes of the mask layer, the through holes of the first planarization layer, and the through holes of the first buffer layer.

It should be noted that the first planarization layer and the first buffer layer may be patterned using an additional mask, without providing the above mask layer.

In the preparation method of the mmWave antenna provided by the embodiment of the present disclosure, the electrode layer is at least formed in each through hole of the first buffer layer and each through hole of the first planarization layer, on the one hand, the thickness of the electrode layer along the direction perpendicular to the first baseboard can be controlled according to the thickness of the through holes in the first planarization layer and the first buffer layer along the direction perpendicular to the first baseboard, and the width of the electrode layer along the direction parallel to the first baseboard is controlled according to the width of the through holes in the first planarization layer and the first buffer layer along the direction parallel to the first baseboard, thereby obtaining an electrode layer with a high aspect ratio, that is, both the radiation pattern and the feeder in the mmWave antenna have a high aspect ratio, so that the mmWave antenna can radiate effectively. When the mmWave antenna with extremely narrow linewidth is used in an electronic device, for example when it is integrated into a display device, the impact on the display function of the display device can be greatly reduced or even eliminated.

On the other hand, the first buffer layer can improve the adhesion between the electrode layer and subsequent film layers, and can prevent the film layer before the electrode layer from being over-etched. On yet another hand, the mask layer is mainly used as a mask, thus the patterning of the film layer can be achieved without using additional masks.

In some embodiments, the material of the mask layer includes non-metal.

There is no specific limitation on the above-mentioned non-metal here. For example, the non-metal may include organic materials.

In the preparation method of the mmWave antenna provided by the embodiment of the present disclosure, since the materials of the first buffer layer, the first planarization layer and the mask layer are all organic materials, the first buffer layer, the first planarization layer and the mask layer may be etched by the same equipment. Moreover, when the electrode layer is deposited in the through holes of the first buffer layer, the first planarization layer and the mask layer, the electrode layer may only be in the through holes without being deposited on the surface of the first buffer layer, the first planarization layer and the mask layer, thereby forming the patterned structure of the antenna.

In some embodiments, the step of S312, in which at least two of the first buffer layer, the first planarization layer and the mask layer are treated at the same time to enable the first buffer layer, the first planarization layer and the mask layer each to have a plurality of through holes, includes steps described below.

At S3122, as shown in graph h of FIG. 3, the mask layer 23 is treated to have a plurality of through holes k3.

The material of the mask layer is not specifically limited here. For example, the material of the mask layer may include metals, such as ITO (Indium Tin Oxides), molybdenum (Mo), molybdenum/aluminum/molybdenum (Mo/Al/Mo), titanium/aluminium/titanium (Ti/Al/Ti), and a metal mask layer is used as a hard mask here.

The process of treating the mask layer is not specifically limited here. For example, wet etching may be used to treat the mask layer. Specifically, since the metal mask layer is used as a hard mask, in order to ensure the line width accuracy of etching and reduce over-etching, it is necessary to coat photoresist 3 on the mask layer 23 (with reference to graphs g, h of FIG. 3) to pattern the mask layer 23 and etch away a large area of metal area. At this time, a long etching time may be used. For example, if it takes 90 s to completely etch away the mask layer 23 of 3000 Å (material is Mo/Al/Mo), then the etching time needs to be 90 s or above, and over-etching will have no effect.

At S3123, as shown in graph i of FIG. 3, the first planarization layer 21 and the first buffer layer 22 are treated sequentially at the same time, so that both the first planarization layer 21 and the first buffer layer 22 have a plurality of through holes k4.

There is no specific limitation on the above-mentioned process of sequentially treating the first planarization layer and the first buffer layer at the same time. For example, dry etching and wet etching may be used to treat the first planarization layer and the first buffer layer. Specifically, as shown in graph i of FIG. 3, dry etching is used to treat the first planarization layer 21 and the first buffer layer 22; then as shown in graph j of FIG. 3, photoresist 3 is coated in the through holes of the first planarization layer 21 and the first buffer layer 22 that are dry-etched, and a metal hard mask is used as a mask to etch the first planarization layer 21 and the first buffer layer 22 through wet etching, at this time, patterned can be made first, using tetrafluoromethane (CF4) to etch away the hard mask, and then changing the gas composition and using oxygen (O2) to etch the photoresist of the first planarization layer and the first buffer layer. Since 02 cannot etch the hard mask, the etched area of the first planarization layer and the first buffer layer is the patterned area of the hard mask. Since a large area of metal is used as a hard mask, the mask layer will not be etched, so the etching time can be minimized. For example, 60 seconds can be used for etching to avoid wet etching affecting the line width of the mesh structure.

The step of S412, in which the electrode layer is at least formed in each through hole of the first buffer layer and in each through hole of the first planarization layer, includes steps described below.

At S4122, as shown in graph k of FIG. 3, the mask layer is removed.

The process for removing the mask layer is not specifically limited here. For example, wet etching may be used to remove the mask layer. Due to the protection of the photoresist in the through hole of the first planarization layer and the first buffer layer, the first baseboard and other film layers between the first baseboard and the first buffer layer in the through hole are preserved, and the metal hard mask outside the through hole is etched away.

At S4123, as shown in graph l in FIG. 3, the electrode layer 4 is formed in each through hole of the first planarization layer 21 and in each through hole of the first buffer layer 22.

The process of forming the electrode layer in through holes of the first planarization layer and in through holes of the first buffer layer is not specifically limited. For example, the electrode layer may be formed using an electroplating process.

The thickness of the electrode layer along a direction perpendicular to the first baseboard may be defined by the first planarization layer and the first buffer layer.

In the preparation method of the mmWave antenna provided by the embodiment of the present disclosure, the mask layer is etched through wet etching first, and then the first planarization layer and the first buffer layer are etched through wet etching using a metal hard mask as a mask plate. By using a metal hard mask as a mask to etch the first planarization layer and the first buffer layer, in order to avoid the impact of the metal hard mask on the subsequent electroplating of the electrode layer, the metal hard mask needs to be removed before electroplating the electrode layer. At the same time, it is necessary to protect the first baseboard and other film layers between the first baseboard and the first buffer layer in the etched through hole. Then, the photoresist in the through hole is retained through exposure, without leaving photoresist outside the through hole, so that the electrode layer is well formed in the through hole of the first planarization layer and the first buffer layer.

In some embodiments, the step of S312, in which at least two of the first buffer layer, the first planarization layer and the mask layer are treated at the same time to enable the first buffer layer, the first planarization layer and the mask layer each to have a plurality of through holes, includes the step described below.

At S3124, as shown in graph h of FIG. 4, the mask layer 23, the first planarization layer 21 and the first buffer layer 22 are treated in sequence at the same time to enable all of the mask layer 23, the first planarization layer 21 and the first buffer layer 22 to have multiple through holes 5.

There is no specific limitation on the process of treating the mask layer, the first planarization layer and the first buffer layer in sequence at the same time. For example, dry etching may be used to treat the mask layer, the first planarization layer and the first buffer layer in sequence at the same time.

Metal materials may be etched through dry etching. However, the dry etching of metal materials is different from the dry etching of organic materials, and it needs to be carried out in a different chamber. Further, there are restrictions on metal materials, for example, molybdenum (Mo), Titanium/aluminum/titanium (Ti/Al/Ti) may be etched through dry etching. Accordingly, during dry etching, it needs to enter the metal chamber first to etch the metal hard mask, and then enter the organic chamber to etch the first planarization layer and the first buffer layer.

The step of S412, in which the electrode layer is at least formed in each through hole of the first buffer layer and in each through hole of the first planarization layer, includes the steps described below.

At S4124, as shown in graph j of FIG. 4, the mask layer 23 is removed.

The process for removing the mask layer is not specifically limited here. For example, wet etching may be used to remove the mask layer. Due to the protection of the photoresist in the through hole of the first planarization layer and the first buffer layer, the first baseboard and other film layers between the first baseboard and the first buffer layer in the through hole are preserved, and the metal hard mask outside the through hole is etched away.

At S4125, as shown in graph k of FIG. 4, the electrode layer 4 is formed in each through hole of the first planarization layer 21 and in each through hole of the first buffer layer 22.

The process of forming the electrode layer in through holes of the first planarization layer and in through holes of the first buffer layer is not specifically limited. For example, the electrode layer may be formed using an electroplating process.

The thickness of the electrode layer along a direction perpendicular to the first baseboard may be defined by the first planarization layer and the first buffer layer.

In the preparation method of the mmWave antenna provided by the embodiment of the present disclosure, first, dry etching is used to etch the mask layer, the first planarization layer and the first buffer layer simultaneously, and then a metal hard mask is used as a mask to etch the first planarization layer and the first buffer layer through wet etching. In order to avoid the impact of the metal hard mask on the subsequent electroplating of the electrode layer, the metal hard mask needs to be etched away before electroplating the electrode layer. At the same time, it is necessary to protect the first baseboard and other film layers between the first baseboard and the first buffer layer in the etched through hole. Then, the photoresist in the through hole is retained through exposure, without leaving photoresist outside the through hole, so that the electrode layer is well formed in the through hole of the first planarization layer and the first buffer layer.

In some embodiments, the material of the mask layer includes metal.

There is no specific limitation on the metal. For example, the metal may include ITO, molybdenum (Mo), molybdenum/aluminum/molybdenum (Mo/Al/Mo), titanium/aluminum/titanium (Ti/Al/Ti), etc.

The preparation process of the mask layer is not specifically limited here. For example, dry etching may be used to pattern the metal mask layer; or wet etching may be used to pattern the metal mask layer.

In the preparation method of the mmWave antenna provided by the embodiment of the present disclosure, a metal hard mask is used as a mask to pattern the first planarization layer and the first buffer layer, the metal hard mask needs to be removed before the electrode layer is electroplated, so as to avoid the impact of the metal hard mask on the subsequent electroplating of the electrode layer.

In some embodiments, after providing the first baseboard in S1 and before forming the definition layer on the first baseboard in S2, the preparation method further includes:

At S5, referring to FIG. 1 to FIG. 4, a surface seed layer 6 is formed on the first baseboard 1.

The material of the surface seed layer is not specifically limited here. For example, the material of the surface seed layer may include metals or metal alloys or metal oxides, such as copper (Cu), silver (Ag), molybdenum-copper alloy (Mo/Cu), indium tin oxide and silver alloy (ITO/Ag), as long as the electroplating can be performed. As a further example, the material of the surface seed layer may be copper or silver.

The preparation process of the surface seed layer is not specifically limited. As an example, the surface seed layer may be formed through sputtering. It should be noted that the surface seed layer may not be provided. In this case, the preparation process of the electrode layer needs to be changed.

In the preparation method of the nmWave antenna provided by the embodiment of the present disclosure, the surface seed layer is formed before forming the definition layer, which is beneficial to the subsequent preparation of the definition layer, especially beneficial to electroplating thicker electrode layer metal later.

In some embodiments, after forming the electrode layer in each through hole of the definition layer in S4, the preparation method further includes steps described below.

At S6, referring to FIG. 1 to FIG. 4, a second planarization layer 7 is formed on the electrode layer 4.

The material of the second planarization layer is not specifically limited here. For example, the material of the second planarization layer may include high-temperature stable photoresist (OC).

In the preparation method of the mmWave antenna provided by the embodiment of the present disclosure, a second planarization layer is formed on the electrode layer, thereby achieving a leveling effect. Due to the unevenness of the metal of the electroplated electrode layer, some of the through holes are not filled, and the metal surface of the electroplated electrode layer is uneven. Therefore, it is necessary to use a second planarization layer for flattening again to prevent the transmittance from being affected by the morphology of the metal surface of the electrode layer.

In some embodiments, after forming the second planarization layer on the electrode layer in S6, the preparation method further includes the step described below.

At S7, referring to FIG. 1 to FIG. 4, a second baseboard 8 is formed on the second planarization layer 7.

The material of the second baseboard is not specifically limited here. For example, the material of the second baseboard may include rigid materials, such as glass. COP, PET. Alternatively, the material of the second baseboard may include flexible materials, such as PI, TAC (triacetate cellulose film), TPU (Polyurethane elastomer).

In the preparation method of the mmWave antenna provided by the embodiment of the present disclosure, a second baseboard is formed on the second planarization layer, that is, coating a film on the second planarization layer, and the second baseboard functions as a carrier.

In some embodiments, after providing the first baseboard in S1 and before forming the surface seed layer on the first baseboard in S5, the preparation method further includes the step described below.

At S8, referring to FIG. 1 to FIG. 4, a peeling layer 5 is formed on the first baseboard 1.

The material of the peeling layer is not specifically limited here. For example, the material of the peeling layer may include materials with high temperature stability, such as materials based on ethylene glycol monobutyl ether. Alternatively, the material of the peeling layer may include polymer materials with high temperature stability (greater than 230° C.), such as polyurethane, polyacrylic materials.

The preparation process of the peeling layer is not specifically limited here. For example, the peeling layer may be formed using a coating process.

After forming the second baseboard on the second planarization layer in S7, the preparation method further includes the step described below.

At S9, referring to FIG. 1 to FIG. 4, the peeling layer 5 and the first baseboard 1 are removed.

The process for removing the peeling layer and the first baseboard is not specifically limited here. For example, the peeling layer and the first baseboard may be removed by mechanical manner or laser sintering.

In the preparation method of the mmWave antenna provided by the embodiment of the present disclosure, the peeling layer can be easily removed from the first baseboard, and is easily separated.

It should be noted that the first baseboard may not be removed. In this case, there is no need to provide a peeling layer between the first baseboard and other film layers. In the case that the first baseboard is not removed, a first protective layer may also be formed on a side of the first baseboard facing away from other film layers.

In some embodiments, after removing the peeling layer and the first baseboard in S9, the preparation method further includes the step described below.

At S10, referring to FIG. 1 to FIG. 4, the surface seed layer 6 is removed.

The process of removing the surface seed layer is not specifically limited here. For example, an etching process may be used to remove the surface seed layer.

In the preparation method of the mmWave antenna provided by the embodiment of the present disclosure, since surface electroplating is used, after the peeling layer and the first baseboard is removed, it is necessary to etch the surface seed layer once to etch away the opaque and conductive surface seed layer, so that a narrow linewidth transparent antenna with high transparent performance and high aspect ratio can be obtained.

In some embodiments, after forming the second baseboard on the second planarization layer, the preparation method further includes the step described below.

At S11, referring to FIG. 1 to FIG. 4, a second protective layer 9 is formed on the second baseboard 8.

In the preparation method of the mmWave antenna provided in the embodiment of the present disclosure, a narrow linewidth transparent antenna with high transparent performance and high aspect ratio can be protected by a second protective layer.

It should be noted, an adhesion layer (not shown in FIG. 1 to FIG. 4) needs to be added between layers such as the first planarization layer, the second planarization layer, the second baseboard to ensure that the above film layers can adhere firmly. The material of the adhesion layer is not specifically limited here. For example, the material of the adhesion layer may include highly transparent glue, such as OCA (Optically Clear Adhesive), PMMA (polymethylmethacrylate), PSA (Pressure Sensitive Adhesive), etc.

In the preparation of the mmWave antenna, the film layer finally retained needs to be a transparent film layer, and there is no limitation on whether other film layers are transparent, so that mmWave antenna can be better applied to the display area of the electronic device, minimizing or even eliminating the impact on the display effect of the electronic device.

A preparation method of a first millimeter wave antenna is provided below with reference to FIG. 1.

At S0011, as shown in graph a of FIG. 1, a first baseboard 1 is provided.

At S0012, as shown in graph b of FIG. 1, a peeling layer 5 is formed by coating ethylene glycol monobutyl ether on the first baseboard 1.

At S0013, as shown in graph c of FIG. 1, a surface seed layer 6 is formed on the peeling layer 5 by sputtering Cu.

At S0014, as shown in graph d of FIG. 1, a first planarization layer 21 is formed by depositing a transparent photoresist on the surface seed layer 6, and a photoresist 3 is coated on the first planarization layer 21.

At S0015, as shown in graph e of FIG. 1, the first planarization layer 21 is patterned to form through holes k1 of the first planarization layer 21.

At S0016, as shown in graph f of FIG. 1, an electrode layer 4 is formed by electroplating metal in the through holes k1 of the first planarization layer 21.

At S0017, as shown in graph g of FIG. 1, the electrode layer 4 is leveled, and a second planarization layer 7 is formed on the electrode layer 4.

At S0018, as shown in graph h of FIG. 1, a second baseboard 8 is formed by coating PI on the second planarization layer 7.

At S0019, as shown in graph i of FIG. 1, a second protective layer 9 is formed on the second baseboard 8.

At S0020, as shown in graph j of FIG. 1, the surface seed layer 6 is peeled off from the peeling layer 5 using the laser sintering.

At S0021, as shown in graph k of FIG. 1, a millimeter wave antenna is obtained by etching away the surface seed layer 6.

It should be noted that the mmWave antenna may also include a first planarization layer, an electrode layer and a second planarization layer; or the mmeWave antenna may further include a first planarization layer, an electrode layer, a second planarization layer and a second baseboard, which is not specifically limited here.

A preparation method of a second millimeter wave antenna is provided below with reference to FIG. 2.

At S0031, as shown in graph a of FIG. 2, a first baseboard 1 is provided.

At S0032, as shown in graph b of FIG. 2, a peeling layer 5 is formed by coating ethylene glycol monobutyl ether on the first baseboard 1.

At S0033, as shown in graph c of FIG. 2, a surface seed layer 6 is formed by depositing Ag on the peeling layer 5.

At S0034, as shown in graph d of FIG. 2, a first buffer layer 22 is formed by depositing silicon nitride on the surface seed layer 6 using PECVD.

Figure 5:
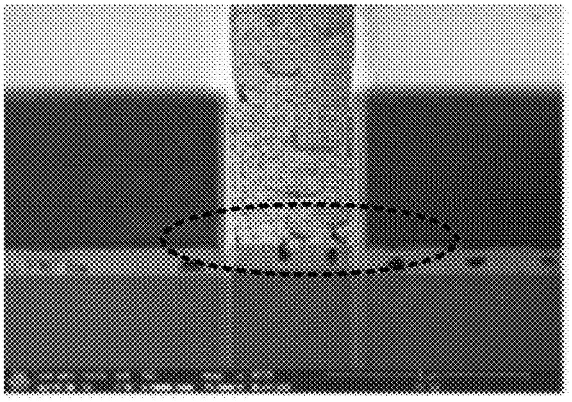
FIG. 5 is a schematic structural diagram illustrating the millimeter wave antenna shown in graph d of FIG. 2, without a first buffer layer, provided by an embodiment of the present disclosure.
Figure 6:
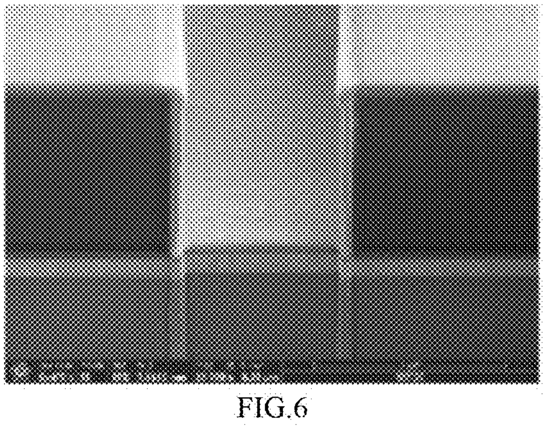
FIG. 6 is a schematic structural diagram illustrating the millimeter wave antenna shown in graph d of FIG. 2 provided by an embodiment of the present disclosure.

FIG. 5 below is a structural diagram of an antenna without a first buffer layer, where through holes are indicated by the dotted lines. FIG. 6 is a structural diagram of an antenna that is provided with a first buffer layer. The first buffer layer is used for protecting the metal below from being etched by oxygen. If the first buffer layer of silicon nitride is not provided, no matter whether the material of the surface seed layer is copper or silver, the surface seed layer will be oxidized to different degrees. As shown by the dotted line in FIG. 5, after the copper seed layer is oxidized, the surface will be loose and porous, thus the interface adhesion thereof will reduce, and the seed layer is easy to peel off in subsequent processes. Although the loose porous structure shown by the dotted line in FIG. 5 will not be formed in the silver seed layer, the silver at local area will become non-conductive due to severe oxidation.

At S0035, as shown in graph e of FIG. 2, a first planarization layer 21 is formed by depositing transparent photoresist on the first buffer layer 22.

At S0036, as shown in graph f of FIG. 2, a mask layer 23 is formed by depositing an organic material on the first planarization layer 21.

At S0037, as shown in graph g of FIG. 2, photoresist 3 is coated on the mask layer 23.

At S0038, as show in graph h of FIG. 2, the mask layer 23 is etched via dry etching using CF4, then the first flat layer 21 and the first buffer layer 22 are etched via dry etching using O2, thereby forming through hole k2 in the mask layer 23, the first flat layer 21 and the first buffer layer 22.

At S0039, as shown in graph i of FIG. 2, an electrode layer 4 is formed by electroplating metal in the through hole k2 in the mask layer 23, the first planarization layer 21 and the first buffer layer 22.

Figure 7:
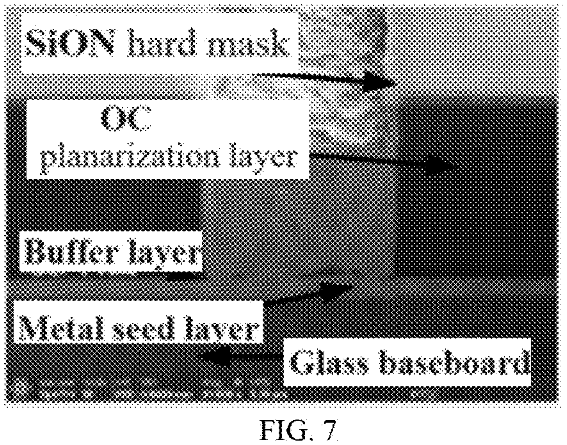
FIG. 7 is a schematic structural diagram illustrating the millimeter wave antenna shown in graph i of FIG. 2 provided by an embodiment of the present disclosure.
Figure 8:
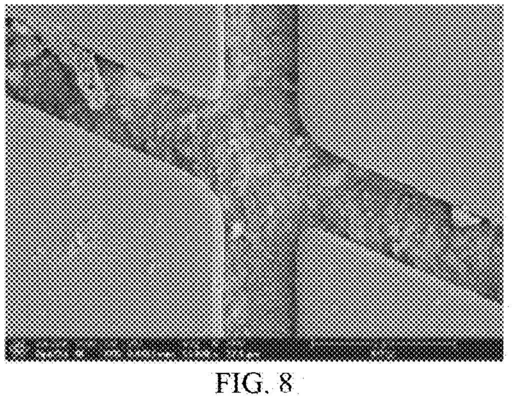
FIG. 8 is a schematic diagram illustrating a mesh structure of the millimeter wave antenna shown in graph i of FIG. 2 provided by an embodiment of the present disclosure.

FIG. 7 is a structural diagram illustrating the antenna formed in the above step S0039, and FIG. 8 is a schematic diagram illustrating a metal mesh structure.

At S0040, as shown in graph j of FIG. 2, the electrode layer 4 is leveled, and a second planarization layer 7 is formed on the electrode layer 4.

At S0041, as shown in graph k of FIG. 2, a second baseboard 8 is formed by coating PI on the second planarization layer 7.

At S0042, as shown in graph l of FIG. 2, a second protective layer 9 is formed on the second baseboard 8.

At S0043, as shown in graph m of FIG. 2, the surface seed layer 6 is peeled off from the peeling layer 5 using the laser sintering.

At S0044, as shown in graph n of FIG. 2, a millimeter wave antenna is obtained by etching away the surface seed layer 6.

It should be noted, the millimeter wave antenna may further include a first buffer layer, a first planarization layer, a mask layer, an electrode layer and a second planarization layer; or, the millimeter wave antenna may further include a first buffer layer, a first planarization layer, a mask layer, an electrode layer, a second planarization layer and a second baseboard, which is not specifically limited here.

A preparation method of a third millimeter wave antenna is provided below with reference to FIG. 3.

At S0051, as shown in graph a of FIG. 3, a first baseboard 1 is provided.

At S0052, as shown in graph b of FIG. 3, a peeling layer 5 is formed by coating ethylene glycol monobutyl ether on the first baseboard 1.

At S0053, as shown in graph c of FIG. 3, a surface seed layer 6 is formed by depositing metal on the peeling layer 5.

At S0054, as shown in graph d of FIG. 3, a first buffer layer 22 is formed by depositing silicon nitride on the surface seed layer 6 using PECVD.

At S0055, as shown in graph e of FIG. 3, a first planarization layer 21 is formed by depositing transparent photoresist on the first buffer layer 22.

At S0056, as shown in graph f of FIG. 3, a mask layer 23 is formed by depositing metal on the first planarization layer 21.

At S0057, as shown in graph g of FIG. 3, photoresist 3 is coated on the mask layer 23.

At S0058, as shown in graph h of FIG. 3, the mask layer 23 is etched using wet etching, and through holes k3 are formed in the mask layer 23.

Figure 9:
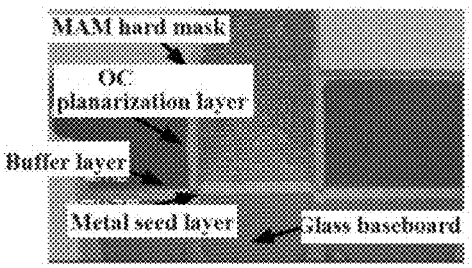
FIG. 9 is a schematic structural diagram illustrating the millimeter wave antenna shown in graph h of FIG. 3 provided by an embodiment of the present disclosure.

FIG. 9 is a structural diagram illustrating the antenna formed in step S0058.

At S0059, as shown in graph i of FIG. 3, the first planarization layer 21 and the first buffer layer 22 are etched using dry etching, so that through holes k4 are formed in the first planarization layer 21 and the first buffer layer 22.

At S0060, as shown in graph j of FIG. 3, photoresist 3 is coated in the through holes in the first planarization layer 21 and the first buffer layer 22.

At S0061, as shown in graph k of FIG. 3, the first planarization layer 21 and the first buffer layer 22 are etched using wet etching, so that through holes are formed in the first planarization layer 21 and the first buffer layer 22.

At S0062, as shown in graph l of FIG. 3, an electrode layer 4 is formed by electroplating metal in the through holes in the first planarization layer 21 and the first buffer layer 22.

At S0063, as shown in graph m of FIG. 3, the electrode layer 4 is leveled, and a second planarization layer 7 is formed on the electrode layer 4.

At S0064, as shown in graph n of FIG. 3, a second baseboard 8 is formed by coating PI on the second planarization layer 7.

At S0065, as shown in graph o of FIG. 3, a second protective layer 9 is formed on the second baseboard 8.

At S0066, as shown in graph p of FIG. 3, the surface seed layer 6 is peeled off from the peeling layer 5 using the laser sintering.

At S0037, as shown in graph q of FIG. 3, a millimeter wave antenna is obtained by etching away the surface seed layer 6.

It should be noted, the millimeter wave antenna may further include a first buffer layer, a first planarization layer, an electrode layer and a second planarization layer; or the millimeter wave antenna may further include a first buffer layer, a first planarization layer, an electrode layer, a second planarization layer and a second baseboard, which is not specifically limited here.

A preparation method of a fourth millimeter wave antenna is provided below with reference to FIG. 4.

At S0071, as shown in graph a of FIG. 4, a first baseboard 1 is provided.

At S0072, as shown in graph b of FIG. 4, a peeling layer 5 is formed by coating ethylene glycol monobutyl ether on the first baseboard 1.

At S0073, as shown in graph c of FIG. 4, a surface seed layer 6 is formed by depositing metal on the peeling layer 5.

At S0074, as shown in graph d of FIG. 4, a first buffer layer 22 is formed by depositing silicon nitride on the surface seed layer 6 using PECVD.

At 0075, as shown in graph e of FIG. 4, a first planarization layer 21 is formed by depositing transparent photoresist on the first buffer layer 22.

At S0076, as shown in graph f of FIG. 4, a mask layer 23 is formed by depositing metal on the first planarization layer 21.

At S0077, as shown in graph g of FIG. 4, photoresist 3 is coated on the mask layer 23.

At S0078, as shown in graph h of FIG. 4, the mask layer 23, the first planarization layer 21 and the first buffer layer 22 are etched using dry etching, so that through holes k5 are formed in the mask layer 23, the first planarization layer 21 and the first buffer layer 22.

At S0079, as shown in graph i of FIG. 4, photoresist 3 is coated in the through holes in the first planarization layer 21 and the first buffer layer 22.

At S0080, as shown in graph j of FIG. 4, the first planarization layer 21 and the first buffer layer 22 are etched using wet etching to form through holes of the first planarization layer 21 and the first buffer layer 22, and the mask layer 23 is removed.

At S0081, as shown in graph k of FIG. 4, an electrode layer 4 is formed by electroplating metal in the through holes in the first planarization layer 21 and the first buffer layer 22.

At S0082, as shown in graph l of FIG. 4, the electrode layer 4 is leveled, and a second planarization layer 7 is formed on the electrode layer 4.

At S0083, as shown in graph m of FIG. 4, a second baseboard 8 is formed by coating PI on the second planarization layer 7.

At S0084, as shown in graph n of FIG. 4, a second protective layer 9 is formed on the second baseboard 8.

At S0085, as shown in graph o of FIG. 4, the surface seed layer 6 is peeled off from the peeling layer 5 using the laser sintering.

At S0086, as shown in graph p of FIG. 4, a millimeter wave antenna is obtained by etching away the surface seed layer 6.

It should be noted, the millimeter wave antenna may further include a first buffer layer, a first planarization layer, an electrode layer and a second planarization layer; or the millimeter wave antenna may further include a first buffer layer, a first planarization layer, an electrode layer, a second planarization layer and a second baseboard, which is not specifically limited here.

Figure 10:
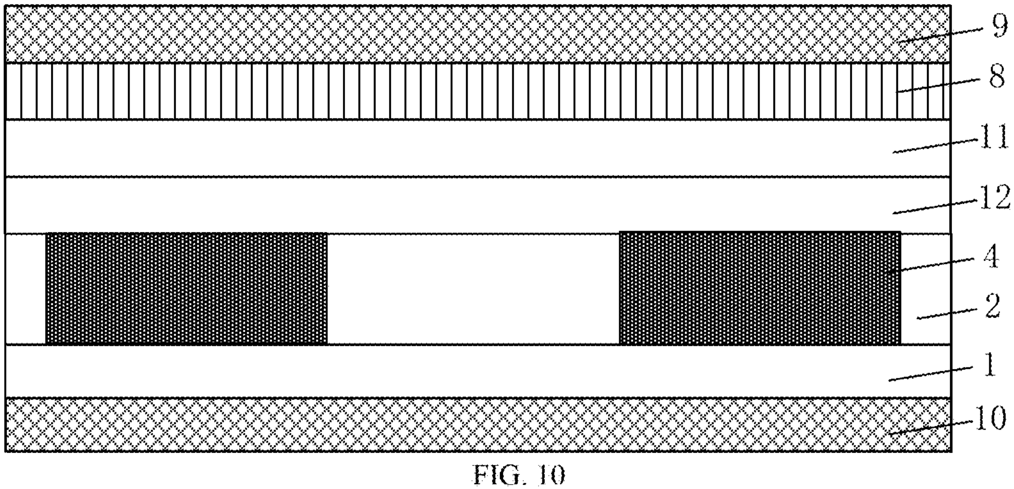
FIG. 10 is a schematic structural diagram illustrating a millimeter wave antenna provided by an embodiment of the present disclosure.

An embodiment of the present disclosure further provides a millimeter wave antenna prepared by the above method for preparing a millimeter wave antenna. As shown in FIG. 10, the millimeter wave antenna includes a first baseboard 1, a definition layer 2 and an electrode layer 4.

The first baseboard is of many types, which may be selected and set according to actual needs. As an example, the first baseboard may be a rigid baseboard, and the material of the rigid baseboard may include, for example, glass, PC (Polycarbonate), COP (Copolymers of Cycloolefin), PMMA (Polymethyl Methacrylate), PET (Polyethylene Terephthalate), etc. As an example, the first baseboard may be a flexible baseboard, and the material of the flexible baseboard may include, for example, PI (Polyimide), PEN (Polyethylene Naphthalate Two Formic Acid Glycol Ester) and the like.

The structure of the first baseboard is not specifically limited. For example, other film layers may be formed directly on the first baseboard; or, the first baseboard may include a substrate, on which other film layers may be directly formed, which is determined according to the actual application.

The definition layer 2 is provided on the first baseboard 1, and the definition layer 2 has a plurality of through holes.

The structure of the definition layer is not specifically limited here. For example, the definition layer may include only one layer, for example, the definition layer shown in FIG. 1 includes the first planarization layer 21. In some embodiments, the definition layer may include multiple layers, for example, the definition layer shown in FIG. 2 includes the first buffer layer 22, the first planarization layer 21 and the mask layer 23 that are stacked in sequence. Of course, the definition layer may further include other film layers, which is determined according to the actual application.

The electrode layer 4 is arranged in the through holes of the definition layer 2, and includes a radiation pattern and a feeder. Both the radiation pattern and the feeder include a mesh structure.

The material of the electrode layer is not specifically limited here. For example, the material of the electrode layer may be a metal material, such as copper, titanium, magnesium; or a glass fiber with a metal coating; or a resin that is coated with conductive carbon materials at the surface thereof, and the conductive carbon materials include graphene, carbon fiber, and carbon nanotubes.

The number of the feeders is not specifically limited, and may be determined according to the type of mmWave antenna, specific conditions, etc. For example, in the case that the mmWave antenna is a dual-polarized antenna, the number of the feeders may be two; or, in the case that mmWave antenna is not the dual-polarized antenna, the number of the feeders may be one. Of course, the number of the feeders may also be three or more, depending on the actual application.

Figure 12:
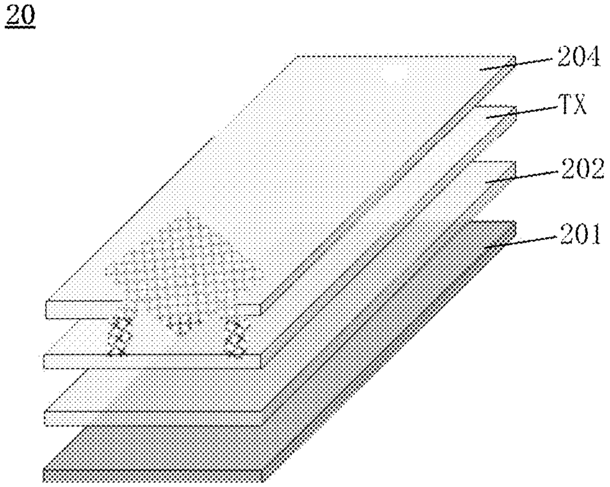
FIG. 12 is a schematic structural diagram illustrating a first display panel provided by an embodiment of the present disclosure.

Both the radiation pattern and the feeder include a mesh structure, and the mesh structure may be a metal mesh structure as shown in FIG. 12. The line width of the metal mesh of the radiation pattern and the feeder is not specifically limited here. For example, the line width of the grid line of the radiation pattern and the feeder may both range from 0.5 to 2 μm, specifically 0.5 μm, 0.8 μm, 1 μm, 1.5 μm, 1.7 μm or 2 μm, etc.

The thickness of the mesh structure is not specifically limited here, and may be controlled by the thickness of the definition layer. The thickness range of the mesh structure is explained by assuming that the material of the electrode layer is metal: considering the unevenness of electroplating, for example, the thickness of the electroplated metal may be 80~90% of the thickness of the definition layer. This is because that a thin metal will affect the radiation efficiency, and a thick metal will seriously affect the transmittance. For example, a ratio range of the thickness of the mesh structure in a direction perpendicular to the first baseboard to the line width of the mesh structure may be greater than or equal to 2. For example, the aspect ratio of the mesh structure may be 2, 3, 4, 5, 6 or 7 and so on.

There is no specific limitation on the spacing between adjacent grid lines in the mesh structure. For example, the spacing between adjacent grid lines in the mesh structure may be in a range of 20~250 μm, preferably 50~200 μm, specifically be 50 μm, 100 μm or 200 μm, etc.

There is no specific limitation on the light transmittance of the mesh structure. For example, the light transmittance of the mesh structure may be greater than 80%. For example, the light transmittance range is 86~92%, specifically 86%, 87%, 88%, 89%, 90%, 91% or 92%, etc.

The line width of the grid lines of the radiation pattern may be set to be smaller than the spacing between adjacent grid lines of the radiation pattern, and the thickness of the radiation pattern in a direction perpendicular to the first baseboard may be set to be greater than the line width of the grid lines of the radiation pattern. The line width of the grid lines of the feeder may be set to be smaller than the spacing between adjacent grid lines of the radiation pattern, and the thickness of the feeder in a direction perpendicular to the first baseboard may be set to be greater than the line width of the grid lines of the radiation pattern.

On the one hand, by configuring the radiation pattern and the feeder with a mesh structure, and providing a non-opaque first baseboard, etc., an electrode layer with a better light transmittance performance can be obtained. On the other hand, by adjusting the line width and thickness of the mesh structure, it is possible to obtain an electrode layer with a high aspect ratio to ensure the radiation of the antenna, and it is also possible to further improve the light transmission performance of the electrode layer without affecting the electrical performance of each radiation pattern, thereby improving the light transmission performance of the mmWave antenna. Thus, the mmWave antenna can be better used in the display area of the electronic device.

It should be noted that the specific line widths of the grid lines of the radiation pattern and the feeder, the specific dimensions of the spacing between adjacent grid lines, their respective specific thicknesses in the direction perpendicular to the first baseboard, etc. may be the same, or they may different.

The millimeter wave antenna provided by the embodiment of the present disclosure includes a first baseboard; a definition layer provided on the first baseboard and including a plurality of through holes; an electrode layer provided in the through holes of the definition layer; the electrode layer includes a radiation pattern and a feeder, both the radiation pattern and the feeder include a mesh structure. In this way, on the one hand, since the electrode layer is arranged in the through holes of the definition layer, the thickness of the electrode layer along the direction perpendicular to the first baseboard can be controlled according to the thickness of the through holes of the definition layer along the direction perpendicular to the first baseboard, and the width of the electrode layer along the direction parallel to the first baseboard can be controlled according to the width of the through holes of the definition layer along the direction parallel to the first baseboard, thereby obtaining an electrode layer with a high aspect ratio, that is, both the radiation pattern and the feeder in the mmWave antenna have a high aspect ratio, so that the mmWave antenna can radiate effectively; moreover, when the mmWave antenna with extremely narrow line width is used in an electronic device, for example when it is integrated into a display device, the impact on the display function of the display device can be greatly reduced or even eliminated; on the other hand, the light transmittance of the electrode layer can be effectively increased by configuring both the radiation pattern and feeder as a mesh structure, so that the mmWave antenna as a whole has a transparent effect with excellent light transmittance, and the light transmittance range can reach 86~92%, which is more conducive to the application of the mmWave antenna in a display device.

In some embodiments, the definition layer at least includes a first planarization layer; the first planarization layer has a plurality of through holes, and the electrode layer is at least disposed in the through holes of the first planarization layer.

The material of the first planarization layer is not specifically limited here. For example, the material of the first planarization layer may include high-temperature stable photoresist (Photoetching, OC for short), and the high-temperature stable photoresist also has a light transmittance of more than 90%. For example, the material of the first planarization layer may include highly transparent photoresist or organic materials.

When the antenna in the related art has a high aspect ratio, the structural stability thereof is not good. Especially when the aspect ratio is large, taking the electrode layer of the metal material as an example, the contact area between the metal and the bottom surface is limited, thus the center of gravity is high, collapse or disconnection is prone to occur. Moreover, the uniformity of wet etching is poor, resulting in low antenna yield. Then, in order to realize a transparent antenna with a high aspect ratio, the metal grid lines of the electrode layer need to be reinforced. The function of the first planarization layer is to improve the uniformity of wet etching and ensure that the electroplated metal to grow in a specified direction. Therefore, the width and thickness of the mmWave antenna provided by the embodiment of the present disclosure can be controlled through the first planarization layer.

In some embodiments, the definition layer at least includes a first planarization layer; the first planarization layer has a plurality of through holes, and the electrode layer is disposed in the through holes of the first planarization layer. Therefore, the width and thickness of the millimeter wave antenna provided in the embodiment of the present disclosure can be controlled only through the first planarization layer, which is simple and easy to implement.

In some embodiments, the definition layer further includes: a first buffer layer disposed between the first baseboard and the first planarization layer; and a mask layer disposed on a side of the first planarization layer facing away from the first baseboard. The first buffer layer, the first planarization layer and the mask layer each have a plurality of through holes, and the electrode layer is disposed in the through holes of the mask layer, the through holes of the first planarization layer, and the through holes of the first buffer layer.

The material of the first buffer layer is not specifically limited here. For example, the material of the first buffer layer may include silicon nitride (SiN), silicon oxide (SiO), silicon oxynitride (SiON), laminated silicon nitride and silicon oxide (two or more layers of SiN/SiO), etc.

The material of the mask layer is not specifically limited here. For example, the material of the mask layer may include metals, such as ITO (Indium Tin Oxides), molybdenum (Mo), molybdenum/aluminum/molybdenum (Mo/Al/Mo), titanium/aluminum/titanium (Ti/Al/Ti), etc. For example, the material of the mask layer may include non-metals, such as organic materials.

In the millimeter wave antenna provided by the embodiment of the present disclosure, the electrode layer is disposed in the through holes of the mask layer, the through holes of the first planarization layer, and the through holes of the first buffer layer, so that the thickness of the electrode layer along the direction perpendicular to the first baseboard can be controlled through the thickness of the through holes of the first buffer layer, the first planarization layer and the mask layer along the direction perpendicular to the first baseboard, the width of the electrode layer along the direction parallel to the first baseboard can be controlled through the width of the through holes of the first buffer layer and the first planarization layer along the direction parallel to the first baseboard, thereby obtaining an electrode layer with a high aspect ratio, that is, both the radiation pattern and the feeder in the mmWave antenna have a high aspect ratio, so that the mmWave antenna can radiate effectively. Moreover, when the mmWave antenna with extremely narrow line width is used in an electronic device, for example when it is integrated into a display device, the impact on the display function of the display device can be greatly reduced or even eliminated. Furthermore, the first buffer layer can improve the adhesion between the electrode layer and subsequent film layers, and the mask layer can be used as a mask, which is simple and easy to implement.

In some embodiments, the definition layer further includes a first buffer layer disposed between the first baseboard and the first planarization layer, both the first buffer layer and the first planarization layer have a plurality of through holes, and the electrode layer is disposed in the through holes of the first planarization layer and in the through holes of the first buffer layer.

In the method for preparing the mmWave antenna provided by the embodiment of the present disclosure, the electrode layer is disposed in the through holes of the first planarization layer and in the through holes of the first buffer layer, so that one the one hand, the thickness of the electrode layer along the direction perpendicular to the first baseboard can be controlled through the thickness of the through holes of the first buffer layer and the first planarization layer along the direction perpendicular to the first baseboard, the width of the electrode layer along the direction parallel to the first baseboard can be controlled through the width of the through holes of the first buffer layer and the first planarization layer along the direction parallel to the first baseboard, thereby obtaining an electrode layer with a high aspect ratio, that is, both the radiation pattern and the feeder in the mmWave antenna have a high aspect ratio, so that the mmWave antenna can radiate effectively; when the mmWave antenna with extremely narrow line width is used in an electronic device, for example when it is integrated into a display device, the impact on the display function of the display device can be greatly reduced or even eliminated; on the other hand, the first buffer layer can improve the adhesion between the electrode layer and subsequent film layers, and can prevent the film layer before the electrode layer from being over-etched; on yet another hand, the mask layer is mainly used as a mask, thus the patterning of the film layer can be achieved without using additional masks.

It should be noted, referring to FIG. 10, the millimeter wave antenna further includes: a first protective layer 10 disposed on a side of the first baseboard 1 facing away from the definition layer 2; an encapsulation layer 12 disposed on a side of the definition layer 2 facing away from the first baseboard 1; an adhesion layer 11; a second baseboard 8 and a second protective layer 9. The encapsulation layer 12 is disposed between the definition layer 2 and the adhesion layer 11, the adhesion layer 11 is disposed between the encapsulation layer 12 and the second baseboard 8, and the second baseboard 8 is disposed between the adhesion layer 11 and the second protective layer 9. Of course, the first baseboard 1 and the first protective layer 10 may be removed.

The millimeter wave antenna shown in FIG. 10 can be directly installed in a display device. The display device further includes a display baseboard. The millimeter wave antenna shown in FIG. 10 is located on the light emitting side of the display baseboard, and the electrode layer 4 is disposed close to the display baseboard. In this case, the millimeter wave antenna is being up-mounted, and the distance between the electrode layer 4 and the display baseboard is relatively close, which may affect the electromagnetic waves radiated by the millimeter wave antenna.

Figure 11:
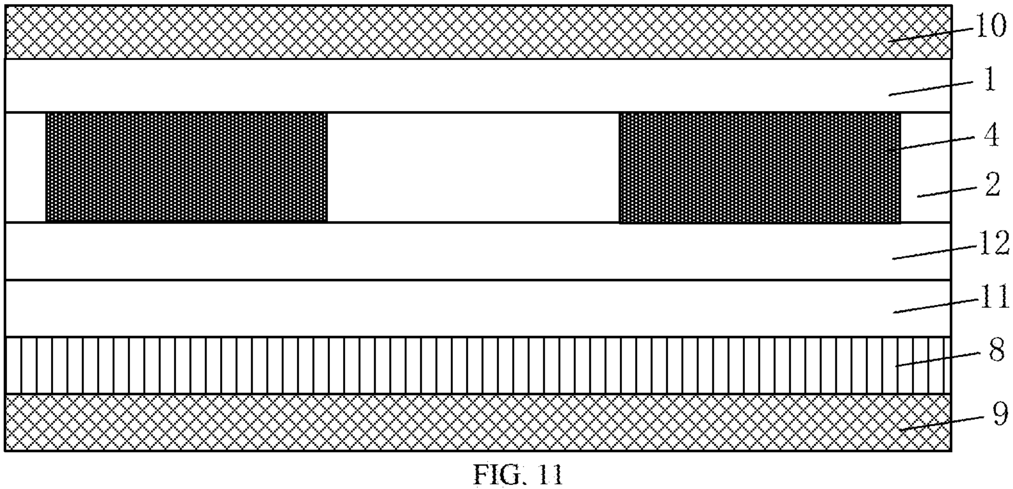
FIG. 11 is a schematic structural diagram in which the millimeter wave antenna shown in FIG. 10 is inverted.

In order to reduce or even eliminate the impact of the display baseboard on the electromagnetic waves radiated by the millimeter wave antenna, the millimeter wave antenna shown in FIG. 10 may be rotated into the millimeter wave antenna shown in FIG. 11. The millimeter wave antenna shown in FIG. 11 is located on the light emitting side of the display baseboard, and the electrode layer 4 is disposed facing away from the display baseboard. In this case, the millimeter wave antenna is flipped. Since the distance between the electrode layer 4 and the display baseboard is relatively long, the impact on the electromagnetic waves radiated by the millimeter wave antenna is very small.

An embodiment of the present disclosure further provides an electronic device, including the above-mentioned millimeter wave antenna.

The electronic device is suitable for various circuit scenarios based on rigid baseboards and flexible baseboards, which is not specifically limited here.

According to the electronic device provided by the embodiment of the present disclosure, on the one hand, since the electrode layer is arranged in the through holes of the definition layer, the thickness of the electrode layer along the direction perpendicular to the first baseboard can be controlled according to the thickness of the through holes of the definition layer along the direction perpendicular to the first baseboard, and the width of the electrode layer along the direction parallel to the first baseboard can be controlled according to the width of the through holes of the definition layer along the direction parallel to the first baseboard, thereby obtaining an electrode layer with a high aspect ratio, that is, both the radiation pattern and the feeder in the mmWave antenna have a high aspect ratio, so that the mmWave antenna can radiate effectively; moreover, when the mmWave antenna with extremely narrow line width is used in an electronic device, for example when it is integrated into a display device, the impact on the display function of the display device can be greatly reduced or even eliminated; on the other hand, the light transmittance of the electrode layer can be effectively increased by configuring both the radiation pattern and feeder as a mesh structure, so that the mmWave antenna as a whole has a transparent effect with excellent light transmittance, and the light transmittance range can reach 86~92%, which is more conducive to the application of the mmWave antenna in a display device.

In some embodiments, with reference to FIG. 13 to FIG. 16, the electronic device includes a display device. The display device includes a display panel 20. The display panel 20 includes a display baseboard 201 and the millimeter wave antenna TX described above. The millimeter wave antenna TX is disposed on the light emitting side of the display baseboard 201.

The display baseboard may include an LCD (Liquid Crystal Display) baseboard, or an OLED (Organic Light-Emitting Diode) display baseboard, which is not specifically limited here.

The millimeter wave antenna is arranged on the light emitting side of the display baseboard. Since the millimeter wave antenna is transparent, it will not affect the display of the display baseboard.

In the electronic device provided by the embodiment of the present disclosure, the millimeter wave antenna has a high aspect ratio, so that the millimeter wave antenna can perform effective radiation. Moreover, a millimeter wave antenna with extremely narrow line width is applied to the light emitting side of the display device, which can greatly reduce or even eliminate the impact on the display function of the display device.

In some embodiments, referring to FIG. 13 to FIG. 16, the display panel 20 further includes a touch layer 202 disposed between the display baseboard 201 and the millimeter wave antenna TX.

Alternatively, as shown in FIG. 13 to FIG. 16, the touch layer 202 is provided on a side of the millimeter wave antenna TX far away from the display baseboard 201.

The structure of the touch layer is not limited. For example, the touch layer can adopt a mutual capacitance touch structure or a self-capacitance touch structure. The mutual capacitance touch structure or the self-capacitance touch structure may be obtained according to relevant technologies and will not be described in detail here. For example, the structure of the touch layer may include a FMLOC (Flexible Multi-Layer On Cell) touch structure, which can reduce the thickness of the screen, thereby facilitating folding; and there is no fit tolerance, thus the frame width can be reduced. The FMLOC structure may be obtained according to relevant technologies and will not be described in detail here.

Since the electronic device provided by the embodiment of the present disclosure has a touch layer that does not affect the normal operation of the antenna, the touch function can also be realized.

In some embodiments, with reference to FIG. 13 to FIG. 16, the display panel 20 further includes: a first polarizing unit 203 that is disposed on a side of the millimeter wave antenna TX facing away from the display baseboard 201; and a cover plate 204 that is disposed on a side of the first polarizing unit 203 facing away from the display baseboard 201.

The material and type of the first polarizing unit are not specifically limited here. For example, the material of the first polarizing unit may include PVA (polyvinyl alcohol) or PVC (polyvinyl chloride). By way of example, the type of the first polarizing unit may include a linear polarizer or a grating.

There are no specific limitations on the material, structure and the like of the cover plate. For example, the material of the cover plate may include glass. As an example, the cover plate may include one layer or multiple layers.

Since the electronic device provided by the embodiment of the present disclosure has a first polarization unit, the polarization direction of light may be changed to achieve better display. Moreover, because electronic device has a cover plate, the cover plate can protect the screen and prevent the screen from being scratched.

It should be noted that, with reference to FIG. 13 to FIG. 16, the display panel 20 further includes a first adhesive layer 205 between the touch layer 202 and the millimeter wave antenna TX, and a second adhesive layer 206 between the first polarization unit 203 and the cover plate 204, thereby realizing better adhesion between two adjacent layers. There is no specific limitation on the materials of the first adhesive layer and the second adhesive layer. For example, the materials of the first adhesive layer and the second adhesive layer may both include highly transparent glue, such as OCA (Optically Clear Adhesive) etc.

Furthermore, the first polarizing unit can also be used as a cover plate.

Figure 13:
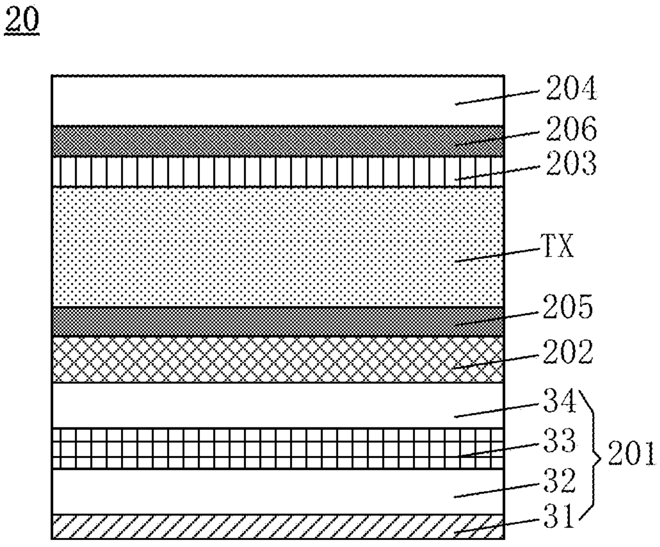
FIG. 13 is a schematic structural diagram illustrating a second display panel provided by an embodiment of the present disclosure.

Referring to FIG. 13, the display baseboard 201 is an LCD. In this case, the display baseboard 201 may include a backlight 31, a first glass baseboard 32, a liquid crystal layer 33 and a second glass baseboard 34 that are stacked in sequence. In this case, Antenna-on-Display structure of the LCD is formed, and the LCD may be a reflective LCD.

Figure 14:
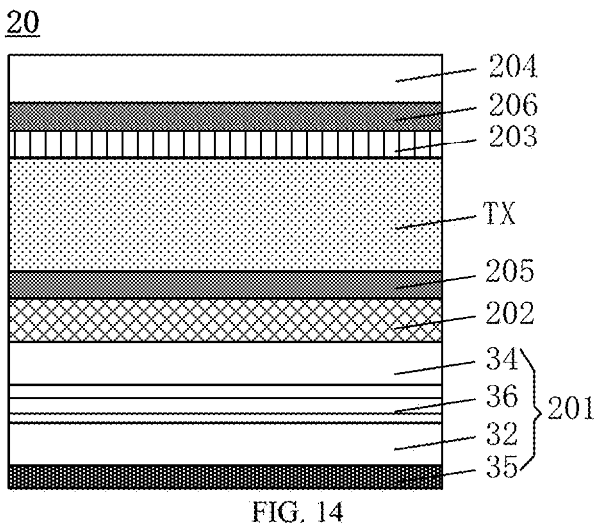
FIG. 14 is a schematic structural diagram illustrating a third display panel provided by an embodiment of the present disclosure.

Referring to FIG. 14, the display baseboard 201 may include a metal heat dissipation film layer 35, a first glass baseboard 32, an OLED 36 and a second glass baseboard 34 that are stacked in sequence, forming a rigid OLED antenna-on-display structure.

Figure 15:
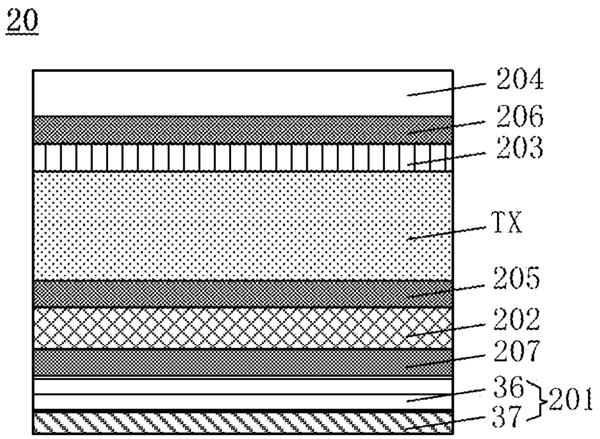
FIG. 15 is a schematic structural diagram illustrating a fourth display panel provided by an embodiment of the present disclosure.

Referring to FIG. 15, the display baseboard 201 may include a flexible substrate 37 and an OLED 36 that are stacked in sequence. The OLED 36 is bonded to the touch layer 202 through a third adhesive layer 207, thus forming a flexible OLED (with an external touch layer) antenna-on-display structure.

Figure 16:
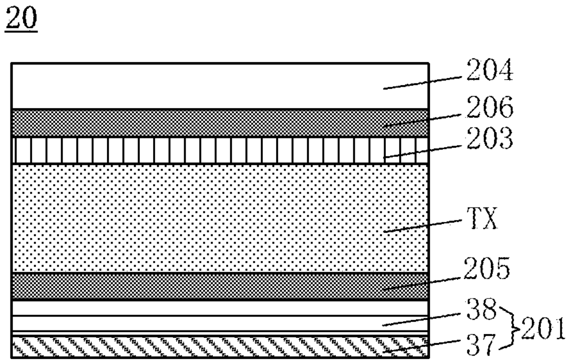
FIG. 16 is a schematic structural diagram illustrating a fifth display panel provided by an embodiment of the present disclosure.

Referring to FIG. 16, the display baseboard 201 may include a flexible substrate 37 and an OLED 38 with an integrated touch function that are stacked in sequence. In this case, a flexible OLED (with an integrated touch) antenna-on-display structure is formed.

Only contents related to the invention point is introduced here, other structures can be obtained by referring to related technologies, and will not be explained in detail here.

Figure 17:
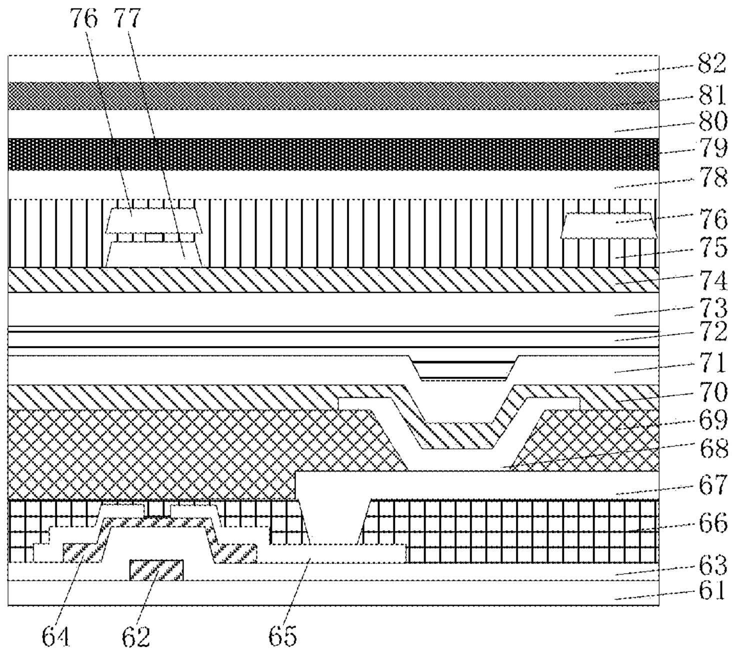
FIG. 17 is a schematic structural diagram illustrating an LCD integrated with a millimeter wave antenna provided by an embodiment of the present disclosure.

Referring to FIG. 17, an OLED (with an external touch layer) antenna-on-display structure is introduced in detail below.

Referring to FIG. 17, the followings are sequentially stacked on the PI substrate 61: a gate 62, a gate insulating layer 63, an active layer 64, a source and drain layer 65, a first planarization layer 66, an anode 67, a pixel definition layer 68, an organic functional layer 69, and a cathode 70, a first organic encapsulation layer 71, an inorganic encapsulation layer 72, a second organic encapsulation layer 73, a second buffer layer 74, a TSP touch layer 75 (including a first metal 76 and a second metal 77), a first OCA layer 78, a transparent millimeter wave antenna layer 79, a polarizer 80, a second OCA layer 81 and a glass cover 82.

Figure 18:
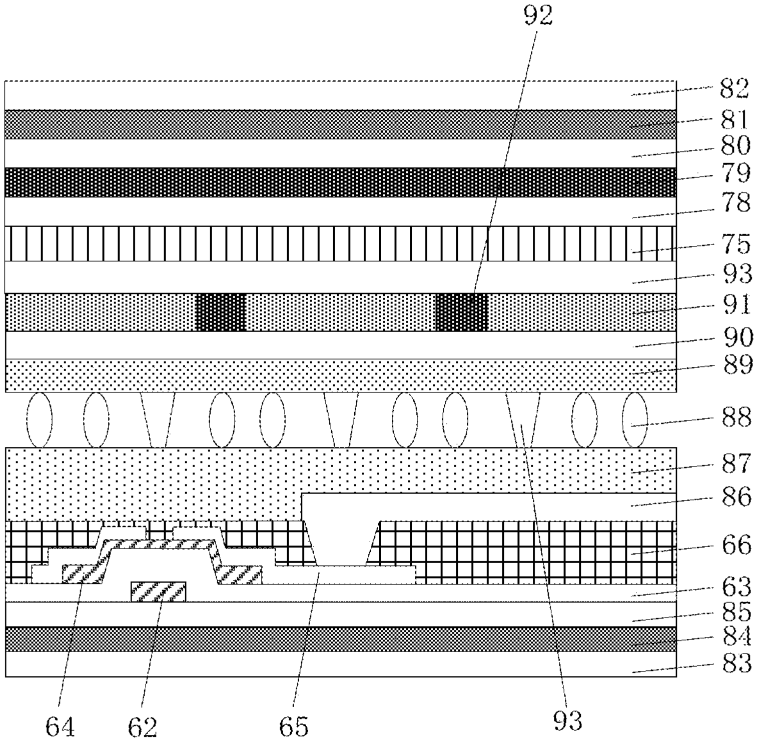
FIG. 18 is a schematic structural diagram illustrating an OLED integrated with a millimeter wave antenna provided by an embodiment of the present disclosure.
Figure 19:
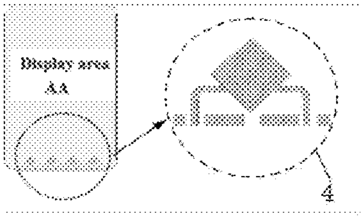
FIG. 19 is a schematic structural diagram illustrating a millimeter wave antenna located in a display area according to an embodiment of the present disclosure.

Referring to FIG. 18, an antenna structure on an LCD screen is introduced in detail below.

Referring to FIG. 18, the followings are sequentially stacked on a backlight module 83: a second polarizer 84, a first glass substrate 85, a gate 62, a gate insulating layer 63, an active layer 64, a source and drain layer 65, a first planarization layer 66, and An ITO layer 86, a first alignment film 87, liquid crystal 88 and a spacer 93, a second alignment film 89, a second ITO layer 90, a color filter layer 91 and a black matrix 92, a second glass substrate 93, a TSP touch layer 75, a first OCA layer 78, a transparent millimeter wave antenna layer 79, a polarizer 80, a second OCA layer 81 and a glass cover 82.

Figure 20:
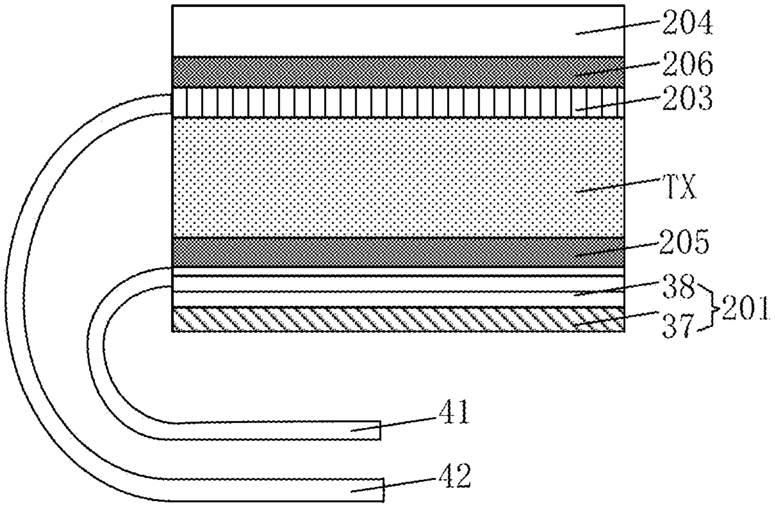
FIG. 20 is a schematic structural diagram illustrating a first display device provided by an embodiment of the present disclosure.
Figure 21:
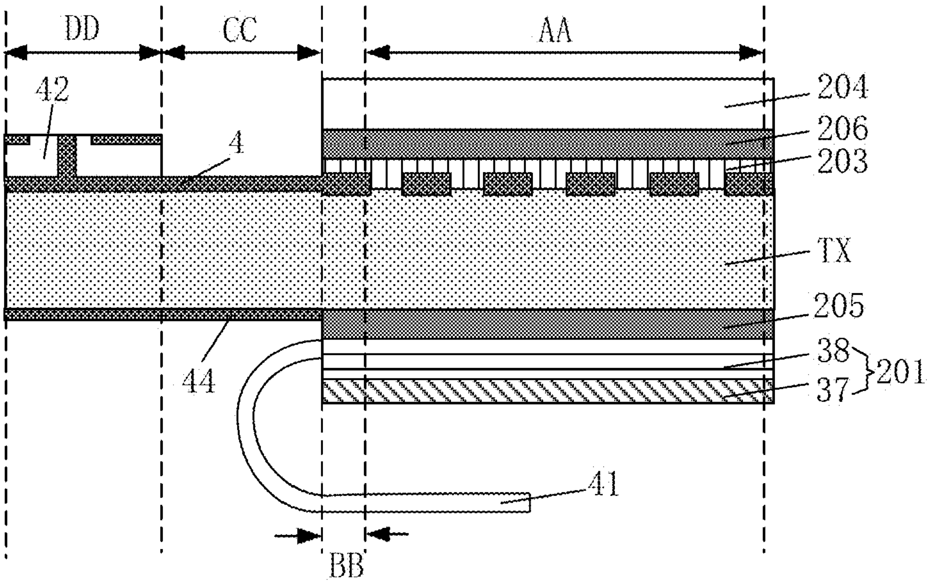
FIG. 21 is a schematic structural diagram illustrating a second display device provided by an embodiment of the present disclosure.
Figure 23:
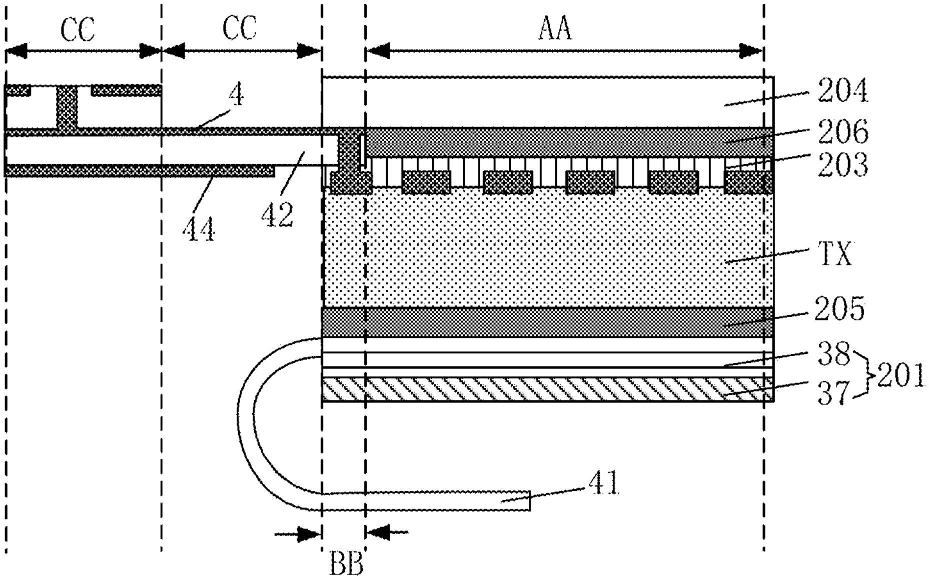
FIG. 23 is a schematic structural diagram illustrating a third display device provided by an embodiment of the present disclosure.

In some embodiments, referring to FIG. 20. FIG. 21 and FIG. 23, the display device further includes a first controller 41 and a second controller 42. The first controller 41 is electrically connected to the display baseboard 201 and is configured to control the display baseboard 201. The second controller 42 is electrically connected to the millimeter wave antenna TX, and is configured to control the millimeter wave antenna TX.

There is no specific limitation on the types of the first controller and the second controller. For example, both the first controller and the second controller may include chips, such as FPC (Flexible Printed Circuit board), PCB (Printed Circuit Board) etc.

There is no specific limitation on the way in which the first controller is electrically connected to the display baseboard. For example, the first controller may be directly electrically connected to the display baseboard; or the first controller may be electrically connected to the display baseboard through other structures.

There is no specific limitation on the way in which the second controller is electrically connected to the millimeter wave antenna. For example, the second controller may be directly electrically connected to the millimeter wave antenna; or the second controller may be electrically connected to the millimeter wave antenna through other structures.

In the display device provided by the embodiment of the present disclosure, the first controller and the second controller can control the operation of the display baseboard and the millimeter wave antenna respectively, so that the radio frequency chip and the connection board of the antenna can be used independently without being integrated with the display chip (the process is incompatible), which is simple and easy to implement.

Figure 22:
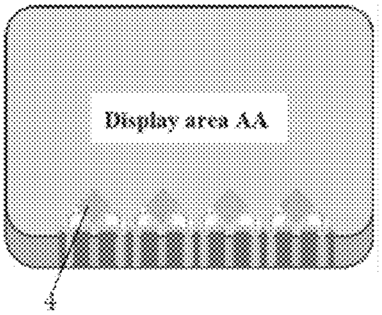
FIG. 22 is a top view of the display device shown in FIG. 21.

In some embodiments, referring to FIG. 21 and FIG. 22, the display panel includes a display area AA and a border area BB connected to the display area, and both the millimeter wave antenna TX and the display baseboard 201 are located in the display area AA and the border area BB; the first controller 41 is bonded to the display baseboard 201 located in the border area BB. The millimeter wave antenna TX also extends along the border area BB of the display panel in a direction away from the display area AA. The part of the millimeter wave antenna TX extending out of the display panel includes a bending area CC and a non-bending area DD. The bending area CC is located between the non-bending area DD and the border area BB of the display panel. The second controller 42 is located in the non-bending area DD, and is bonded to the millimeter wave antenna TX located in the non-bending area DD.

The display area refers to an area for implementing display. The border area is generally configured to provide driving wirings and driving circuits, such as GOA (Gate Driver on Array, array substrate row drive) drive circuit, or configured to provide under display cameras, earpieces or speakers etc.

There is no specific limitation on the way in which the first controller is bonded to the display baseboard located in the border area. For example, the first controller may be directly bonded to the display baseboard located in the border area; or, the first controller may be bonded to the display baseboard located in the border area through other structures.

The bending area refers to an area where the display device can be bent.

Since the transparent millimeter wave antenna is located on the light emitting side of the display, the normal operation of the antenna requires feed from the transmission line, so the transmission line must be bent. For example, taking the flexible OLED as an example, circuits related to displaying and touching are all prepared on the PI substrate and can be easily bent to the back side of the display panel. The transparent millimeter wave antenna provided in the embodiment of the present disclosure is located on different layers from the display baseboard and the touch layer, so the transparent millimeter wave antenna needs to be bent separately.

In the display device provided by the embodiment of the present disclosure, the millimeter wave antenna adopts a flexible baseboard, such as PI-type baseboards made of high strength, highly flexible, and highly transparent materials, which can be bent for a small angle, then the bending area is added during the production of the millimeter wave antenna. As shown in FIG. 21, the production area of the millimeter wave antenna is much greater than the display area AA, extending from the display area AA to the border area BB, the mesh structure being gradually changed to a solid structure. Transparency is not required outside the display area AA.

In this way, the transition from the antenna radiation area to the transmission area is completed, the area outside the bending area can be used to achieve the bonding to connect the transmission line to the second controller 42.

It should be noted that the millimeter wave antenna located in the display area AA is a highly transparent mesh structure. The millimeter wave antenna in the border area BB is not limited, for example, it can be a mesh structure or a solid structure.

In some embodiments, as shown in FIG. 21, the display device also includes a ground layer 44 that is disposed on a side, close to the first baseboard, of a part of the millimeter wave antenna extending outside the display panel. The ground layer is located in the non-bending area and the bending area.

Referring to FIG. 21, the electrode layer 4 in the millimeter wave antenna TX is also provided on the second controller 42 and a side, facing away from the ground layer 4, of the part of the millimeter wave antenna TX extending out of the display panel, and is located in the bending area CC and non-bending region DD. The electrode layer 4 is configured to be bent together with the ground layer 44 in the bending region CC.

There is no specific limitation on the material of the ground layer. For example, the material of the ground layer may be metal.

In the display device provided by the embodiment of the present disclosure, in the area from the display area AA to the border area BB, the millimeter wave antenna gradually changes from a mesh structure to a solid structure, thereby completing the transition from the antenna radiation area to the transmission area. Bonding can be performed outside the bending area to connect the transmission line to the second controller. In addition, grounding can also be achieved through the ground layer.

Figure 24:
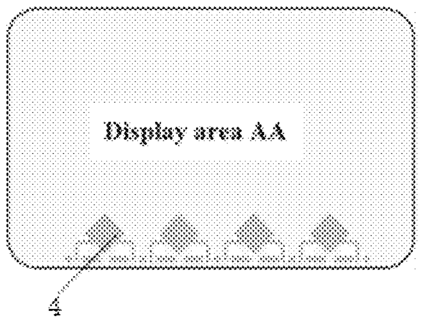
FIG. 24 is a top view of the display device shown in FIG. 23.

In some embodiments, referring to FIG. 23 and FIG. 24, the display panel includes a display area AA and a border area BB connected to the display area AA, and both the millimeter wave antenna TX and the display baseboard 201 are located in the display area AA and the border area BB. The first controller 41 is bonded to the display baseboard 201 located in the border area BB. The second controller 42 is partially located in the border area BB and bonded to the millimeter wave antenna TX located in the border area BB.

There is no specific limitation on the way in which the first controller is bonded to the display baseboard located in the border area. For example, the first controller may be directly bonded to the display baseboard located in the border area; or, the first controller may be bonded to the display baseboard located in the border area through other structures.

There is no specific limitation on the way in which the second controller is bonded to the millimeter wave antenna located in the border area. For example, the second controller may be directly bonded to the millimeter wave antenna located in the border area; or, the second controller may be bonded to the millimeter wave antenna located in the border area through other structures.

In the display device provided by the embodiment of the present disclosure, the millimeter wave antenna may adopt a rigid baseboard, such as COP-type baseboards made of brittle and unpliant materials, which cannot be bent, so no bending area is provided during manufacturing the millimeter wave antenna. As shown in FIG. 23, the production area of the millimeter wave antenna is basically the same as the display area AA in terms of size, and the millimeter wave antenna in the border area BB gradually changes from a mesh structure to a solid structure, and used as a reserved bonding pad. The second controller 42 used by the transmission line is made separately, and the second controller 42 is bonded to the pad of the millimeter wave antenna in the bonding area, so as to complete the transition from the antenna area to the transmission line area.

In some embodiments, referring to FIG. 23, the remaining part of the second controller 42 extends from the border area BB of the display panel in a direction away from the display area AA, and includes a bending area CC and a non-bending area DD. The bending area CC is located between the non-bending area DD and the border area BB of the display panel.

Referring to FIG. 23, the display device also includes a ground layer 44. The ground layer 44 is provided on a side of the second controller 42 close to the first baseboard, and there is a gap between the ground layer 44 and the border area BB. The ground layer 44 is located in the non-bending area DD and a part of the bending area CC.

Referring to FIG. 23, the electrode layer 4 in the millimeter wave antenna TX is also disposed on a side of the second controller 42 facing away from the ground layer 44, and is located in the bending area CC and the non-bending area DD. The electrode layer 4 in the millimeter wave antenna TX is configured to be bent in the bending area CC together with the remaining parts of the second controller 42 and the ground layer 44.

There is no specific limitation on the material of the ground layer. For example, the material of the ground layer may be metal.

In the display device provided by the embodiment of the present disclosure, in the area from the display area AA to the border area BB, the millimeter wave antenna gradually changes from a mesh structure to a solid structure, thereby completing the transition from the antenna radiation area to the transmission area. Binding can be conducted in the border area BB to connect the transmission line to the second controller. In addition, grounding can also be achieved through the ground layer.

An embodiment of the present disclosure further provides a driving method for the electronic device described above.

The driving method includes:

at S01, controlling, by a first controller, the display baseboard to display; and at S02, controlling, by a second controller, the millimeter wave antenna to radiate.

According to the driving method of the electronic device provided by the embodiment of the present disclosure, the first controller and the second controller can control the operation of the display baseboard and the millimeter wave antenna respectively, so that the radio frequency chip and the connection board of the antenna can be used independently without being integrated with the display chip (the process is incompatible), which is simple and easy to implement.

In the specification provided herein, numerous specific details are set forth. However, it is understood that embodiments of the present disclosure may be practiced without these specific details. In some instances, common methods, structures and techniques have not been shown in detail in order not to obscure the understanding of this description.

Finally, it should be noted that the above embodiments are only used to illustrate the technical solutions of the present disclosure, rather than limiting them. Although the present disclosure has been described in detail with reference to the foregoing embodiments, those skilled in the art should understand that, the technical solutions described in the foregoing embodiments can still be modified, or equivalent replacements for some of the technical features may be performed, and these modification or replacement do not make the essence of the corresponding technical solutions deviate from the spirit and scope of the technical solutions of the embodiments of the present disclosure.

The invention claimed is:

1. A method for preparing a millimeter wave antenna, comprising:

providing a first baseboard;

forming a definition layer on the first baseboard;

treating the definition layer to enable the definition layer to have a plurality of through holes; and forming an electrode layer in each of the through holes of the definition layer; wherein the electrode layer comprises a radiation pattern and a feeder, and both of the radiation pattern and the feeder comprise a mesh structure;

wherein the forming a definition layer on the first baseboard comprises:

forming at least a first planarization layer on the first baseboard;

the treating the definition layer to enable the definition layer to have a plurality of through holes comprises:

treating at least the first planarization layer to enable the first planarization layer to have a plurality of through holes;

the forming an electrode layer in each of the through holes of the definition layer comprises:

forming the electrode layer at least in each of the through holes of the first planarization layer;

wherein the forming at least a first planarization layer on the first baseboard comprises:

forming a first buffer layer on the first baseboard;

forming the first planarization layer on the first buffer layer; and forming a mask layer on the first planarization layer;

the treating at least the first planarization layer to enable the first planarization layer to have a plurality of through holes comprises:

treating at least two of the first buffer layer, the first planarization layer and the mask layer simultaneously to enable all of the first buffer layer, the first planarization layer and the mask layer to have a plurality of through holes;

the forming the electrode layer at least in each of the through holes of the first planarization layer comprises:

forming the electrode layer at least in each of the through holes of the first buffer layer and in each of the through holes of the first planarization layer.

2. The method for preparing a millimeter wave antenna according to claim 1, wherein the treating at least two of the first buffer layer, the first planarization layer and the mask layer simultaneously to enable all of the first buffer layer, the first planarization layer and the mask layer to have a plurality of through holes comprises:

treating the mask layer, the first planarization layer and the first buffer layer in sequence simultaneously to enable all of the mask layer, the first planarization layer and the first buffer layer to have a plurality of through holes;

the forming the electrode layer at least in each of the through holes of the first buffer layer and in each of the through holes of the first planarization layer comprises:

forming the electrode layer in each of the through holes of the mask layer, each of the through holes of the first planarization layer, and each of the through holes of the first buffer layer.

3. The method for preparing a millimeter wave antenna according to claim 1, wherein the treating at least two of the first buffer layer, the first planarization layer and the mask layer simultaneously to enable all of the first buffer layer, the first planarization layer and the mask layer to have a plurality of through holes comprises:

treating the mask layer to enable the mask layer to have a plurality of through holes; and treating the first planarization layer and the first buffer layer in sequence simultaneously to enable both of the first planarization layer and the first buffer layer to have a plurality of through holes;

the forming the electrode layer at least in each of the through holes of the first buffer layer and in each of the through holes of the first planarization layer comprises:

removing the mask layer; and forming the electrode layer in each of the through holes of the first planarization layer and in each of the through holes of the first buffer layer.

4. The method for preparing a millimeter wave antenna according to claim 1, wherein the treating at least two of the first buffer layer, the first planarization layer and the mask layer simultaneously to enable all of the first buffer layer, the first planarization layer and the mask layer to have a plurality of through holes comprises:

treating the mask layer, the first planarization layer and the first buffer layer in sequence simultaneously to enable all of the mask layer, the first planarization layer and the first buffer layer to have a plurality of through holes;

the forming the electrode layer at least in each of the through holes of the first buffer layer and in each of the through holes of the first planarization layer comprises:

removing the mask layer; and forming the electrode layer in each of the through holes of the first planarization layer and in each of the through holes of the first buffer layer.

5. The method for preparing a millimeter wave antenna according to claim 1, wherein after providing the first baseboard and before forming the definition layer on the first baseboard, the method further comprises:

forming a surface seed layer on the first baseboard.

6. The method for preparing a millimeter wave antenna according to claim 5, wherein after forming the electrode layer in each of the through holes of the definition layer, the method further comprises:

forming a second planarization layer on the electrode layer;

wherein after forming the second planarization layer on the electrode layer, the method further comprises:

forming a second baseboard on the second planarization layer.

7. The method for preparing a millimeter wave antenna according to claim 6, wherein after providing the first baseboard and before forming the surface seed layer on the first baseboard, the method further comprises:

forming a peeling layer on the first baseboard;

after forming the second baseboard on the second planarization layer, the method further comprises:

removing the peeling layer and the first baseboard.

8. A millimeter wave antenna, comprising:

a first baseboard;

a definition layer, disposed on the first baseboard and comprising a plurality of through holes; and an electrode layer disposed in each of the through holes of the definition layer, wherein the electrode layer comprises a radiation pattern and a feeder, and both of the radiation pattern and the feeder comprise a mesh structure;

wherein the definition layer comprises at least a first planarization layer; the first planarization layer comprises a plurality of through holes, and the electrode layer is at least disposed in each of the through holes of the first planarization layer;

wherein the definition layer further comprises a first buffer layer and a mask layer, wherein the first buffer layer is disposed between the first baseboard and the first planarization layer, and the mask layer is disposed on a side of the first planarization layer facing away from the first baseboard; all of the first buffer layer, the first planarization layer and the mask layer have a plurality of through holes, and the electrode layer is disposed in each of the through holes of the mask layer, in each of the through holes of the first planarization layer, and in each of the through holes of the first buffer layer; or wherein the definition layer further comprises a first buffer layer disposed between the first baseboard and the first planarization layer; both of the first buffer layer and the first planarization layer comprise a plurality of through holes, and the electrode layer is disposed in each of the through holes of the first planarization layer and in each of the through holes of the first buffer layer.

9. An electronic device, wherein the electronic device comprises a display device with a display panel, the display panel comprises a display baseboard and the millimeter wave antenna according to claim 8, the millimeter wave antenna is disposed on a light emitting side of the display baseboard.

10. The electronic device according to claim 9, wherein the display device further comprises a first controller and a second controller, the first controller is electrically connected to the display baseboard and configured to control the display baseboard;

the second controller is electrically connected to the millimeter wave antenna and configured to control the millimeter wave antenna.

11. The electronic device according to claim 10, wherein the display panel comprises a display area and a border area connected to the display area, the millimeter wave antenna and the display baseboard are both located in the display area and the border area;

the first controller is bonded to the display baseboard located in the border area;

the millimeter wave antenna further extends from the border area of the display panel in a direction facing away from the display area, a part of the millimeter wave antenna extending out of the display panel comprises a bending area and a non-bending area, the bending area is located between the non-bending area and the border area of the display panel; the second controller is located in the non-bending area, and is bonded to the part of the millimeter wave antenna located in the non-bending area.

12. The electronic device according to claim 11, further comprising a ground layer, the ground layer is disposed on a side of the part of the millimeter wave antenna extending out the display panel close to the first baseboard, and the ground layer is located in the non-bending area and the bending area;

the electrode layer in the millimeter wave antenna is also disposed on the second controller and a side of the part of the millimeter wave antenna extending out the display panel facing away from the ground layer, and is located in the bending area and the non-bending area, the electrode layer is configured to be bent in the bending area together with the ground layer.

13. The electronic device according to claim 10, wherein the display panel comprises a display area and a border area connected to the display area, and the millimeter wave antenna and the display baseboard are both located in the display area and the border area;

the first controller is bonded to the display baseboard located in the border area;

a part of the second controller is located in the border area, and is bonded to the millimeter wave antenna located in the border area;

wherein a remaining part of the second controller extends from the border area of the display panel in a direction facing away from the display area, and comprises a bending area and a non-bending area, the bending area is located between the non-bending area and the border area of the display panel;

the display device further comprises a ground layer, the ground layer is provided on a side of the second controller close to the first baseboard, and a gap exists between the ground layer and the border area, the ground layer is located in the non-bending area and a part of the bending area;

the electrode layer in the millimeter wave antenna is also disposed on a side of the second controller facing away from the ground layer, and located in the bending area and the non-bending area, the electrode layer in the millimeter wave antenna is configured to be bent in the bending area together with the remaining part of the second controller and the ground layer.

14. A method for driving the electronic device according to claim 10, comprising:

controlling, by the first controller, the display baseboard to display; and controlling, by the second controller, the millimeter wave antenna to radiate.

* * * * *